(12) United States Patent
Komatsubara et al.

(10) Patent No.: US 11,433,761 B2
(45) Date of Patent: Sep. 6, 2022

(54) GRILLE SHUTTER DEVICE

(71) Applicants: AISIN CORPORATION, Aichi (JP); TOYOTA JIDOSHA KABUSHIKI KAISHA, Toyota (JP)

(72) Inventors: Ken Komatsubara, Kariya (JP); Kazuki Tsuboi, Kariya (JP); Shigeki Sato, Kariya (JP); Toshikazu Harada, Toyota (JP); Shuichi Morie, Toyota (JP)

(73) Assignees: AISIN CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/162,057

(22) Filed: Jan. 29, 2021

(65) Prior Publication Data
US 2021/0237556 A1 Aug. 5, 2021

(30) Foreign Application Priority Data
Feb. 5, 2020 (JP) .............................. JP2020-017816

(51) Int. Cl.
*B60K 11/08* (2006.01)
(52) U.S. Cl.
CPC .................. *B60K 11/085* (2013.01)
(58) Field of Classification Search
CPC ....... B60K 11/085; B60K 11/04; B60K 11/08; Y02T 10/88; F01P 7/10; F01P 2031/00
See application file for complete search history.

(56) References Cited

U.S. PATENT DOCUMENTS

| | | | | |
|---|---|---|---|---|
| 2010/0243352 A1* | 9/2010 | Watanabe | ............ | B60K 11/085 180/68.1 |
| 2011/0048691 A1* | 3/2011 | Shin | ..................... | B60K 11/085 165/299 |
| 2014/0137815 A1* | 5/2014 | Hemphill | .................. | F01P 7/12 123/41.05 |
| 2014/0295749 A1* | 10/2014 | Hijikata | ............... | B60K 11/085 454/256 |
| 2015/0020758 A1* | 1/2015 | Hosono | ..................... | F01P 7/02 123/41.04 |
| 2016/0311313 A1 | 10/2016 | Hori | | |
| 2018/0170170 A1* | 6/2018 | Nam | ..................... | B60K 11/085 |

(Continued)

FOREIGN PATENT DOCUMENTS

EP 2233341 A1 * 9/2010 ............ B60K 11/085
JP 2015-101279 A 6/2015
(Continued)

*Primary Examiner* — Kurt Philip Liethen
(74) *Attorney, Agent, or Firm* — Oblon, McClelland, Maier & Neustadt, L.L.P.

(57) ABSTRACT

A grille shutter device opens and closes an introduction passage through which air is introduced from an opening provided at a front part of a vehicle to the inside of the vehicle. The grille shutter device includes: a driving fin and a driven fin that are configured to rotate between an open position in which the introduction passage is open and a closed position in which the introduction passage is closed; an actuator configured to drive the driving fin; a power transmission member configured to transmit power from the driving fin to the driven fin; and a first stopper configured to define a first position by coming into contact with the power transmission member.

6 Claims, 14 Drawing Sheets

(56) References Cited

U.S. PATENT DOCUMENTS

| | | | | |
|---|---|---|---|---|
| 2018/0229598 A1* | 8/2018 | Lambert | ............... | B60K 11/085 |
| 2018/0361846 A1* | 12/2018 | Dudar | ................... | B60K 11/085 |
| 2019/0084409 A1 | 3/2019 | Komatsubara et al. | | |
| 2020/0130500 A1* | 4/2020 | Gallagher Gil | ....... | B60K 11/085 |
| 2020/0215900 A1* | 7/2020 | Kim | ........................ | B60K 11/06 |
| 2021/0023937 A1* | 1/2021 | Gerber | ................. | B60K 11/085 |

FOREIGN PATENT DOCUMENTS

| | | |
|---|---|---|
| JP | 2016-203867 A | 12/2016 |
| JP | 2019-51864 A | 4/2019 |

\* cited by examiner

GRILLE SHUTTER DEVICE

CROSS-REFERENCE TO RELATED APPLICATION

This application claims priority to Japanese Patent Application No. 2020-017816 filed on Feb. 5, 2020, incorporated herein by reference in its entirety.

BACKGROUND

1. Technical Field

The present disclosure relates to a grille shutter device.

2. Description of Related Art

A grille shutter device that adjusts a flow volume of air flowing into an engine compartment by opening and closing an opening formed at a front part of a vehicle is known. For example, Japanese Patent Application Publication No. 2015-101279 describes a grille shutter device including a plurality of movable fins that is disposed next to each other in an up-down direction, an actuator that drives the movable fins, and a link mechanism that transmits power of the actuator to the movable fins. Commonly, grille shutter devices open and close an opening to adjust the temperature of an engine, or close the opening to reduce air resistance that the vehicle experiences while traveling.

SUMMARY

The grille shutter device as described above may become unable to normally open and close the movable fins if a foreign object gets caught between the upper movable fin and the lower movable fin or a load acts on the link mechanism. The present disclosure can detect abnormalities occurring in a power transmission path from the actuator to the movable fins.

One aspect of the present disclosure is a grille shutter device. The grille shutter device opens and closes an introduction passage through which air is introduced from an opening provided at a front part of a vehicle to the inside of the vehicle. The grille shutter device includes: a driving fin and a driven fin that are configured to rotate between an open position in which the introduction passage is open and a closed position in which the introduction passage is closed; an actuator configured to drive the driving fin; a power transmission member configured to transmit power from the driving fin to the driven fin; and a first stopper configured to define a first position by coming into contact with the power transmission member. The first position is one of the open position and the closed position.

For example, a comparative example is assumed in which whether the driving fin has reached the first position is determined based only on the rotation angle of an output shaft of the actuator. In this comparative example, the driving fin and the driven fin can be determined to have reached the first position despite not having reached the first position, as long as the output shaft of the actuator rotates in a situation where there is an abnormality in the driving fin or the power transmission member.

In the above-described configuration, by contrast, whether the driving fin and the driven fin have reached the first position can be determined by detecting the power transmission member coming into contact with the first stopper while the driving fin and the driven fin are moving.

In the grille shutter device, the driving fin and the power transmission member constitute a power transmission path from the actuator to the driven fin. Therefore, if the driving fin and the driven fin become unable to rotate to the first position due to abnormalities occurring in the driving fin and the power transmission member constituting the power transmission path, the power transmission member will not come into contact with the first stopper. Thus, the grille shutter device can detect whether there is an abnormality in the power transmission path based on whether the power transmission member comes into contact with the first stopper.

The grille shutter device can detect abnormalities occurring in the power transmission path from the actuator to the movable fin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A vehicle equipped with a grille shutter device according to a first embodiment will be described below with reference to the drawings. In the following description, an axis extending in a width direction of the vehicle will be referred to as an X-axis; an axis extending in a front-rear direction of the vehicle will be referred to as a Y-axis; and an axis extending in an up-down direction of the vehicle will be referred to as a Z-axis.

Figure 1:
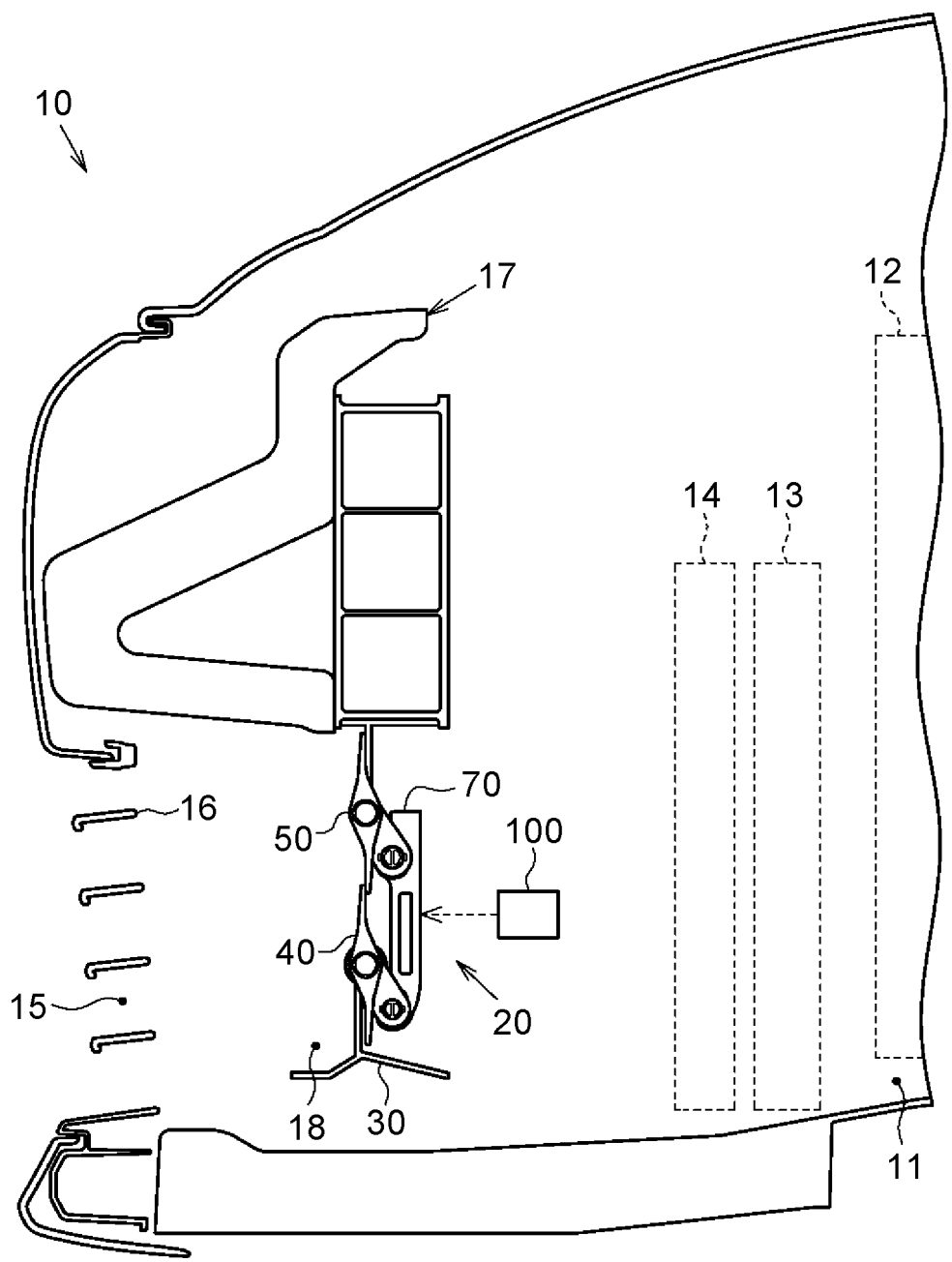
FIG. 1 is a schematic view of a vehicle front part including a grille shutter device of a first embodiment.

As shown in FIG. 1, a vehicle 10 includes an engine 12 that is disposed in an engine compartment 11, a radiator 13 that cools the engine 12, a fan 14 that guides air to the radiator 13, and a front grille 16 that has an opening 15. The vehicle 10 further includes a bumper 17 that constitutes a front part of the vehicle 10 together with the front grille 16, and a grille shutter device 20 that adjusts a flow volume of air introduced into the engine compartment 11.

The grille shutter device 20 is disposed in an introduction passage 18 through which air is introduced from the opening 15 to the engine compartment 11. Specifically, the grille shutter device 20 is disposed at a position in the front-rear direction of the vehicle 10 at which the grille shutter device 20 faces a lower part of the radiator 13. The grille shutter device 20 adjusts the flow volume of air introduced into the engine compartment 11 by opening and closing the introduction passage 18.

Figure 2:
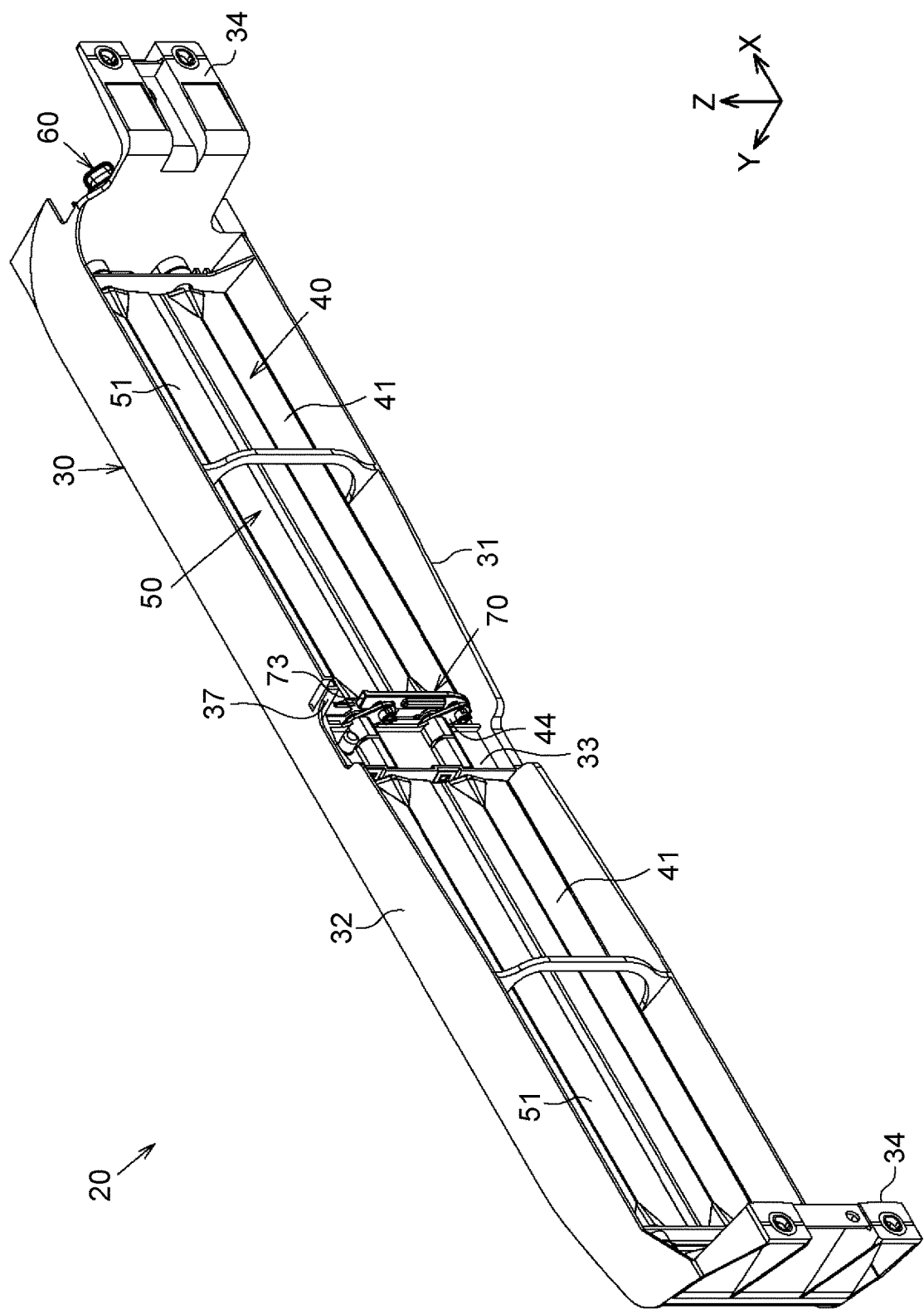
FIG. 2 is a perspective view of the grille shutter device of the first embodiment as seen from a rear upper side.
Figure 3:
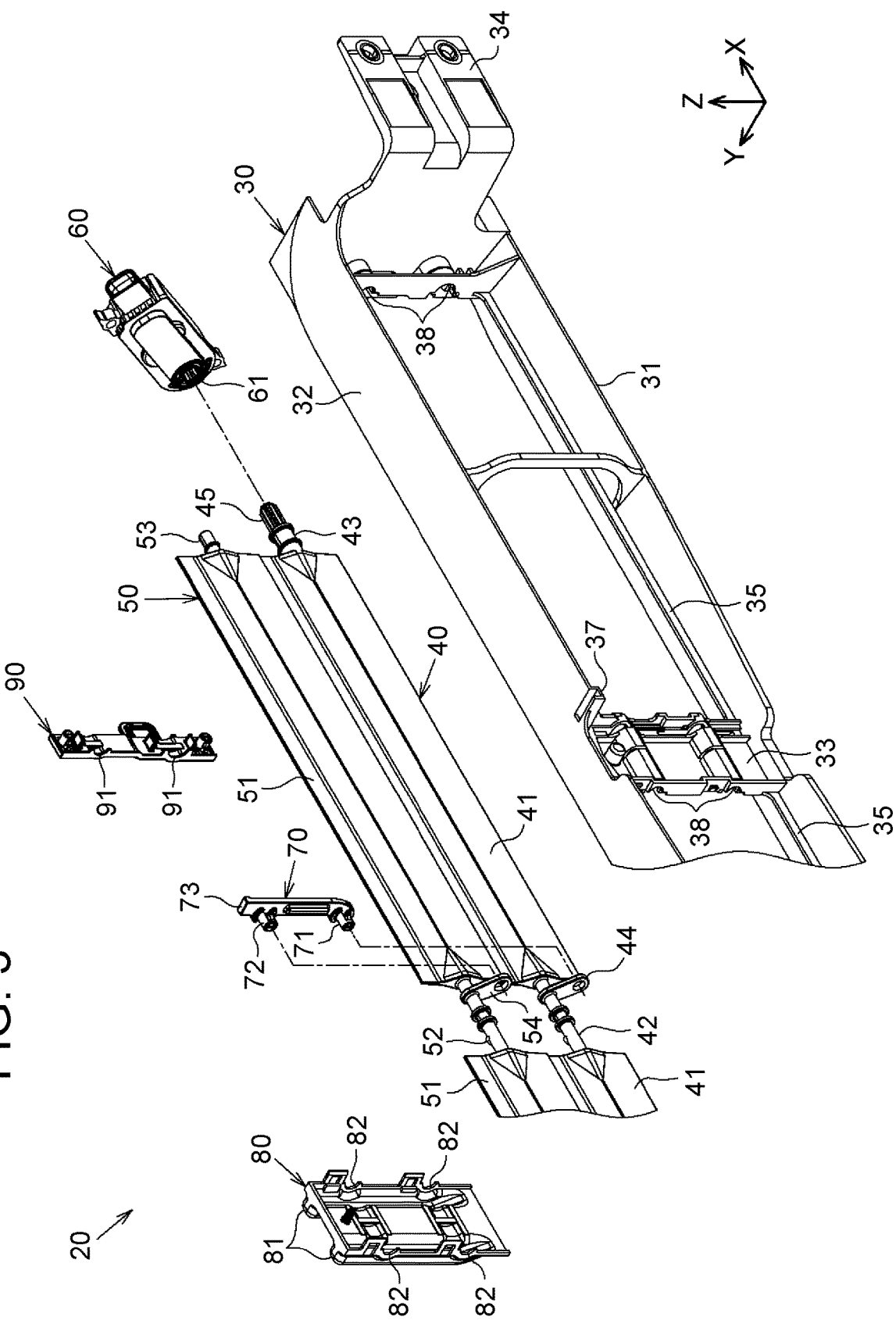
FIG. 3 is an exploded perspective view of the grille shutter device of the first embodiment as seen from the rear upper side.
Figure 4:
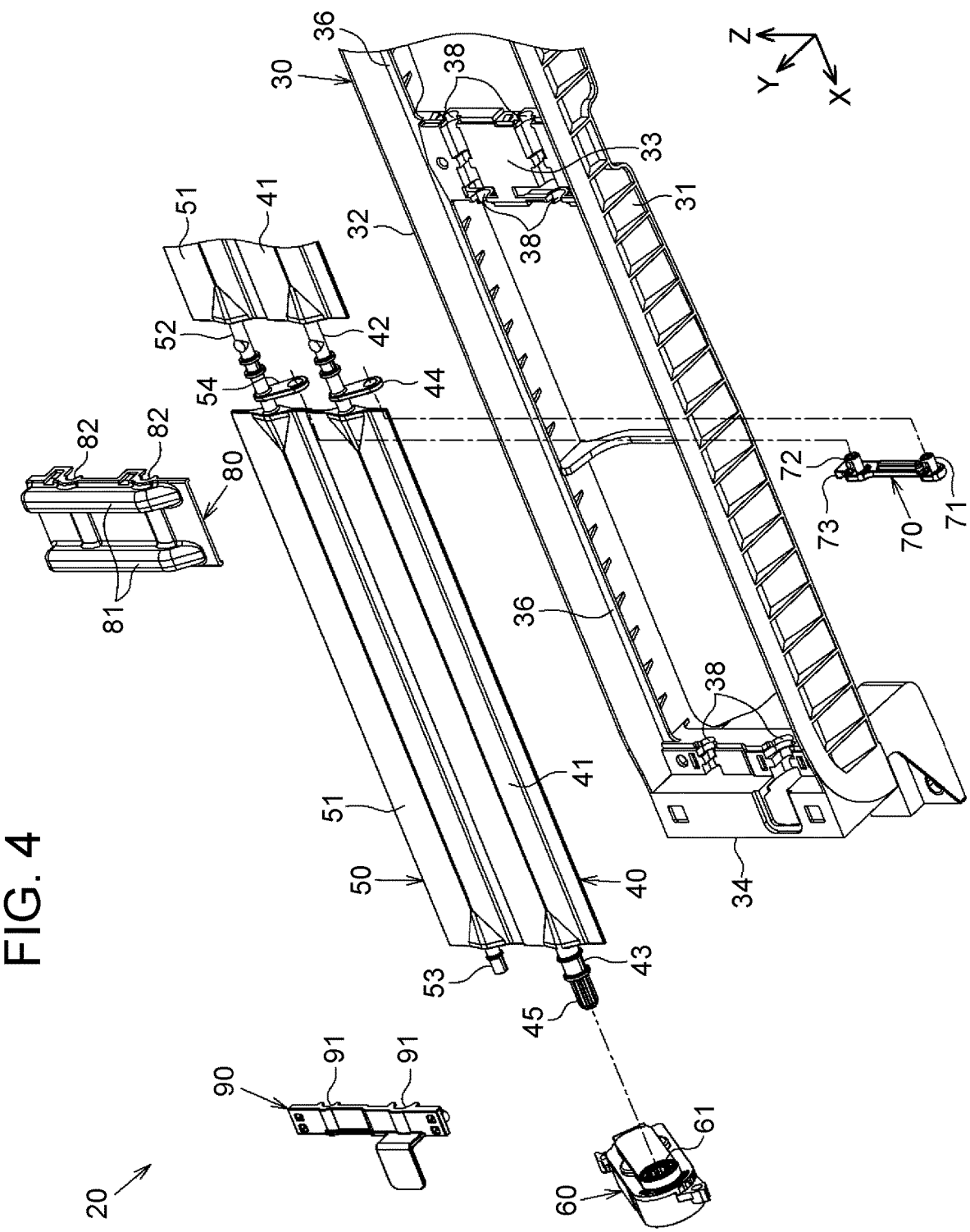
FIG. 4 is an exploded perspective view of the grille shutter device of the first embodiment as seen from a front lower side.

As shown in FIG. 2 to FIG. 4, the grille shutter device 20 includes a frame 30 that constitutes a framework of the grille shutter device 20, a driving fin 40 and a driven fin 50 as one example of the "movable fins" that open and close the introduction passage 18, and an actuator 60 that drives the driving fin 40. The grille shutter device 20 further includes a link member 70 as one example of the "power transmission member" that transmits power from the driving fin 40 to the driven fin 50, and an intermediate cover 80 and end covers 90 that partially cover the driving fin 40 and the driven fin 50. As shown in FIG. 1, the grille shutter device 20 further includes a controller 100 that controls the actuator 60.

As shown in FIG. 2, the frame 30 has a bottom wall 31 and an upper wall 32 that have a longitudinal direction lying in the width direction, an intermediate wall 33 that couples central portions, in the longitudinal direction, of the bottom wall 31 and the upper wall 32 to each other, and a pair of side walls 34 that couple end portions, in the longitudinal direction, of the bottom wall 31 and the upper wall 32 to each other.

As shown in FIG. 3, the bottom wall 31 has a closing stopper 35 that defines a closed position of the driving fin 40 by coming into contact with the driving fin 40. The closing stopper 35 is provided along the bottom wall 31 in the longitudinal direction thereof. The closing stopper 35 extends toward the upper wall 32.

As shown in FIG. 4, the upper wall 32 has a closing stopper 36 that defines a closed position of the driven fin 50 by coming into contact with the driven fin 50. The closing stopper 36 is provided along the upper wall 32 in the longitudinal direction thereof. The closing stopper 36 extends toward the bottom wall 31. As shown in FIG. 3, the upper wall 32 has an opening stopper 37 that defines an open position of the driving fin 40 and the driven fin 50 by coming into contact with the link member 70. The opening stopper 37 is provided at a central portion, in the longitudinal direction, of the upper wall 32. The opening stopper 37 protrudes toward the bottom wall 31, and a leading end of the opening stopper 37 has a flat surface shape.

As shown in FIG. 4, the intermediate wall 33 and the pair of side walls 34 have a plurality of bearings 38 that rotatably supports the driving fin 40 and the driven fin 50. The bearings 38 include a shaft hole having a semicircular shape as seen in a side view from the width direction. As shown in FIG. 4, one side wall 34 of the pair of side walls 34 holds the actuator 60.

As shown in FIG. 3 and FIG. 4, the driving fin 40 has a pair of first blades 41 that are disposed next to each other in an axial direction of the driving fin 40, a first intermediate shaft 42 that couples the pair of first blades 41 to each other, a pair of first shafts 43 that extend respectively from ends of the pair of first blades 41, and a first link 44 that extends in a radial direction from the first intermediate shaft 42. Each of the pair of first blades 41 has a flat plate shape. The shape of a cross-section of the pair of first blades 41 orthogonal to the longitudinal direction thereof is point-symmetrical with respect to a rotational axis of the driving fin 40 as the center. The first shaft 43 extending from one end of one of the first blades 41 includes an input shaft 45 that is connected to the actuator 60.

As shown in FIG. 3 and FIG. 4, the driven fin 50 is disposed next to the driving fin 40 in the up-down direction in the introduction passage 18. The driven fin 50 has a pair of second blades 51 that are disposed next to each other in an axial direction of the driven fin 50, a second intermediate shaft 52 that couples the pair of second blades 51 to each other, a pair of second shafts 53 that extend respectively from ends of the pair of second blades 51, and a second link 54 that extends in a radial direction from the second intermediate shaft 52. Each of the pair of second blades 51 has a flat plate shape. The shape of a cross-section of the pair of second blades 51 orthogonal to the longitudinal direction thereof is point-symmetrical with respect to a rotational axis of the driven fin 50 as the center.

As shown in FIG. 3 and FIG. 4, the actuator 60 is, for example, an electric actuator in which a motor and a reduction gear are integrated. The actuator 60 has an output shaft 61 that is coupled to the input shaft 45 of the driving fin 40. The output shaft 61 has a shaft hole into which the input shaft 45 is inserted. The actuator 60 outputs a rotation angle of the motor, in other words, a signal according to the rotation angle of the output shaft 61, to the controller 100.

As shown in FIG. 3 and FIG. 4, the link member 70 has a substantially rod shape. The link member 70 has a driving coupling part 71 and a driven coupling part 72 that are coupled to the first link 44 of the driving fin 40 and the second link 54 of the driven fin 50, respectively, and a contact part 73 that comes into contact with the opening stopper 37 of the frame 30. The driving coupling part 71 and the driven coupling part 72 protrude in a direction orthogonal to a longitudinal direction of the link member 70, with a space left therebetween in a longitudinal direction of the link member 70. The driving coupling part 71 is coupled to a leading end of the first link 44 of the driving fin 40, and the driven coupling part 72 is coupled to a leading end of the second link 54 of the driven fin 50. Thus, the link member 70 can transmit power from the driving fin 40 to the driven fin 50. The contact part 73 is provided at an end, in the longitudinal direction, of the link member 70. This means that the driven coupling part 72 is located between the contact part 73 and the driving coupling part 71. The contact part 73 has a flat planar shape that is substantially orthogonal to the longitudinal direction of the link member 70.

As shown in FIG. 3 and FIG. 4, the intermediate cover 80 has a substantially rectangular shape as seen in a front view from the front-rear direction. The intermediate cover 80 has a pair of bulges 81 that extend along the intermediate cover 80 in the up-down direction and bulge toward a front side, and a plurality of bearings 82 that rotatably supports the driving fin 40 and the driven fin 50. The pair of bulges 81 are provided with a space left therebetween in the width direction. Each bearing 82 has a shaft hole having a semicircular shape as seen in a side view from the width direction.

Each end cover 90 has a plurality of bearings 91 that rotatably supports the driving fin 40 and the driven fin 50. Each bearing 91 includes a shaft hole having a semicircular shape as seen in a side view from the width direction.

The intermediate cover 80 is mounted to the intermediate wall 33 of the frame 30 by snap fitting. Similarly, the pair of end covers 90 is mounted respectively to the pair of side walls 34 of the frame 30 by snap fitting. In addition, when mounting the intermediate cover 80 and the pair of end covers 90 to the frame 30, fastening members, such as bolts and nuts, or an adhesive may be used.

As shown in FIG. 2, in a state where the grille shutter device 20 is assembled, the first intermediate shaft 42 of the driving fin 40 is held in the front-rear direction between the bearing 38 of the intermediate wall 33 of the frame 30 and the bearing 82 of the intermediate cover 80. The pair of first shafts 43 of the driving fin 40 is held between the bearings 38 of the pair of side walls 34 of the frame 30 and the bearings 91 of the pair of end covers 90. Similarly, the second intermediate shaft 52 of the driven fin 50 is held in the front-rear direction between the bearing 38 of the intermediate wall 33 of the frame 30 and the bearing 82 of the intermediate cover 80. The pair of second shafts 53 of the driven fin 50 are held between the bearings 38 of the pair of side walls 34 of the frame 30 and the bearings 91 of the pair of end covers 90. Thus, the driving fin 40 can rotate around an axis extending in the width direction, and the driven fin 50 can rotate around an axis extending in the width direction, above the rotational axis of the driving fin 40.

Figure 5:
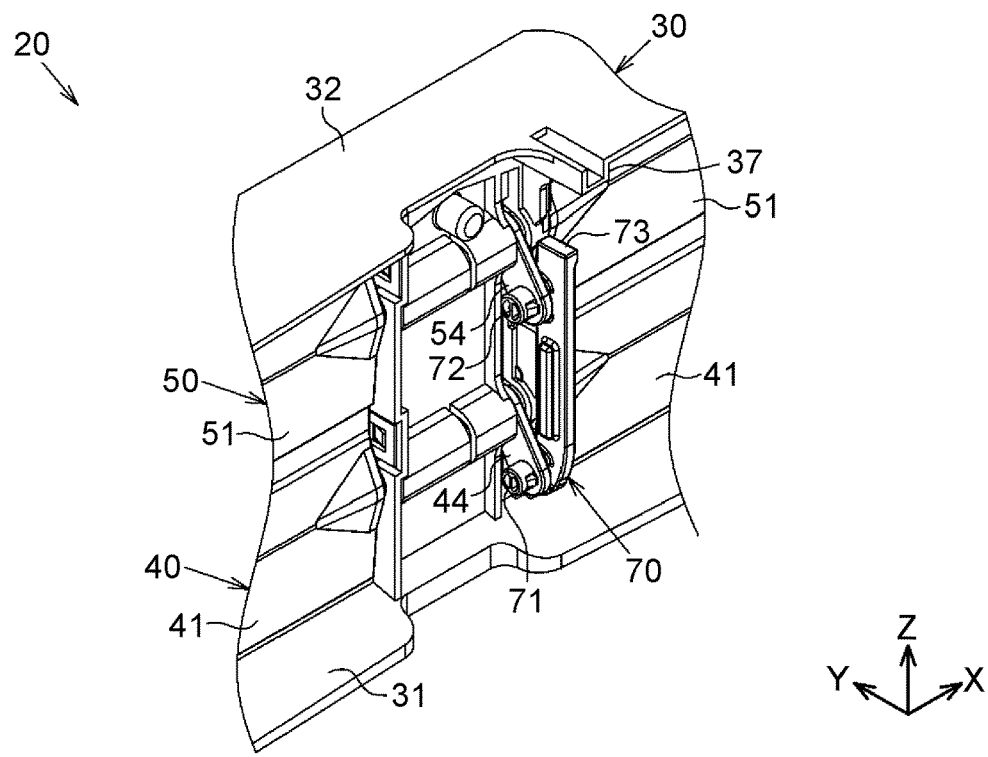
FIG. 5 is a partial perspective view of the grille shutter device of the first embodiment as seen from the rear upper side, with movable fins disposed in a closed position.

As shown in FIG. 5, in a state where the grille shutter device 20 is assembled, the intermediate wall 33 of the frame 30, the first link 44 of the driving fin 40, the second link 54 of the driven fin 50, and the link member 70 constitute a parallel crank mechanism as a so-called four-joint link mechanism. Thus, the posture of the first link 44 of the driving fin 40 and the posture of the second link 54 of the driven fin 50 are linked to each other. In other words, the posture of the driving fin 40 and the posture of the driven fin 50 are linked to each other. The contact part 73 of the link member 70 is directed upward and thereby faces the opening stopper 37 of the frame 30.

Figure 6:
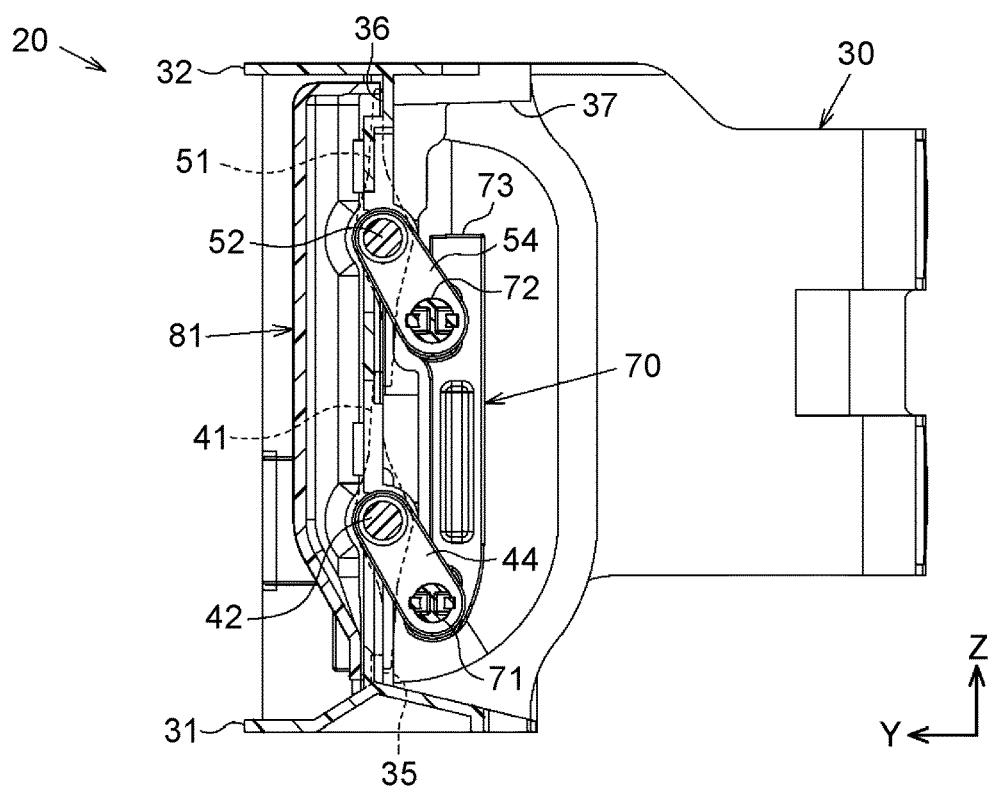
FIG. 6 is a sectional view of the grille shutter device of the first embodiment as seen from a width direction, with the movable fins disposed in the closed position.

Next, the operation of the grille shutter device 20 will be described with reference to FIG. 5 to FIG. 8. As shown in FIG. 5 and FIG. 6, for example, when it is desired to warm up the engine 12 or reduce air resistance that the vehicle experiences while traveling, the actuator 60 is driven to dispose the driving fin 40 and the driven fin 50 in the closed position in which the introduction passage 18 is closed. In this case, the link member 70 is located at a position that is farthest away from the opening stopper 37 of the frame 30 in the up-down direction, i.e., a lowered position that is the lowest position in a movable range of the link member 70. The lowered position of the link member 70 is a position corresponding to the closed position of the driving fin 40 and the driven fin 50. Therefore, when the link member 70 is located in the lowered position, the driving fin 40 and the driven fin 50 are located in the closed position.

When the driving fin 40 is disposed in the closed position, lower ends of the pair of first blades 41 of the driving fin 40 come into contact with the closing stopper 35 of the bottom wall 31 of the frame 30 from a rear side, while upper ends of the pair of second blades 51 of the driven fin 50 come into contact with the closing stopper 36 of the upper wall 32 of the frame 30 from a front side. Further, upper ends of the pair of first blades 41 of the driving fin 40 come into contact respectively with lower ends of the pair of second blades 51 of the driven fin 50. Thus, the closed position of the driving fin 40 and the driven fin 50 is defined by the driving fin 40 and the driven fin 50 coming into contact with the frame 30 and by the driving fin 40 and the driven fin 50 coming into contact with each other.

Figure 7:
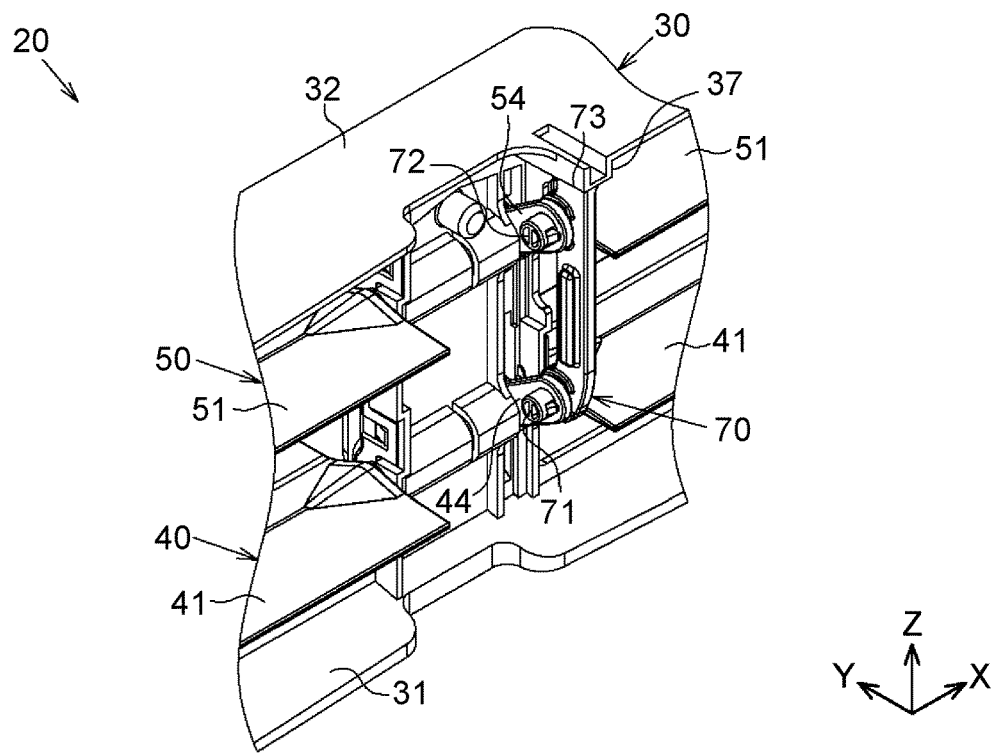
FIG. 7 is a partial perspective view of the grille shutter device of the first embodiment as seen from the rear upper side, with the movable fins disposed in an open position.
Figure 8:
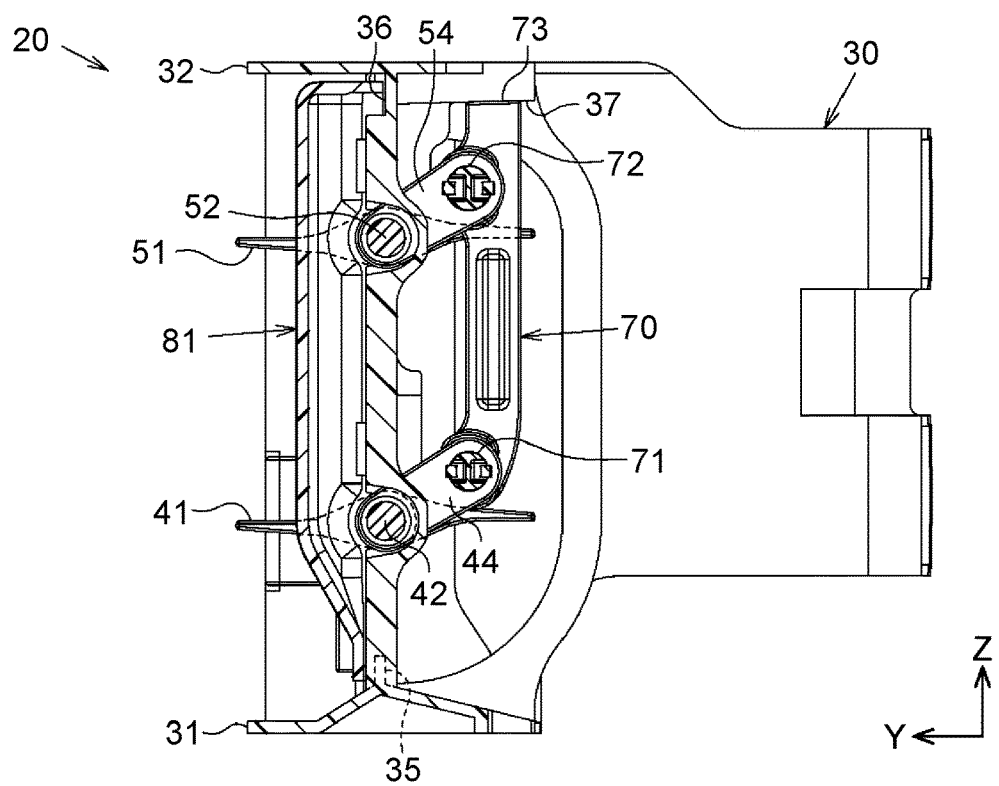
FIG. 8 is a sectional view of the grille shutter device of the first embodiment as seen from the width direction, with the movable fins disposed in the open position.

On the other hand, as shown in FIG. 7 and FIG. 8, for example, when it is desired to cool the engine 12, the actuator 60 is driven to dispose the driving fin 40 and the driven fin 50 in the open position in which the introduction passage 18 is open. In this case, the link member 70 is located at a position at which the link member 70 comes into contact with the opening stopper 37 of the frame 30 in the up-down direction, i.e., a raised position that is the highest position in the movable range of the link member 70. The raised position of the link member 70 is a position corresponding to the open position of the driving fin 40 and the driven fin 50. Therefore, when the link member 70 is located in the raised position, the driving fin 40 and the driven fin 50 are located in the open position.

When the driving fin 40 and the driven fin 50 are located in the open position, the first blades 41 of the driving fin 40 and the second blades 51 of the driven fin 50 come into contact with neither each other nor the frame 30. The open position of the driving fin 40 and the driven fin 50 is defined by the link member 70 and the opening stopper 37 of the frame 30 coming into contact with each other.

Thus, the grille shutter device 20 rotates the driving fin 40 between the closed position and the open position by driving the actuator 60. The grille shutter device 20 rotates the driven fin 50 between the closed position and the open position as the link member 70 transmits power of the driving fin 40 to the driven fin 50. In the first embodiment, the open position is one example of the "first position" in the claims, and the opening stopper 37 is one example of the "first stopper" in the claims. The closed position is one example of the "second position" in the claims, and the closing stopper 35 is one example of the "second stopper" in the claims.

Next, the controller 100 will be described. The controller 100 opens and closes the driving fin 40 by controlling the actuator 60. Specifically, the controller 100 opens the driving fin 40 by the actuator 60 when an opening condition is met, and closes the driving fin 40 by the actuator 60 when a closing condition is met. The opening condition is met, for example, when the temperature of the engine compartment 11 becomes equal to or higher than a predetermined temperature. The closing condition is met, for example, when the temperature of the engine compartment 11 becomes lower than the predetermined temperature or when a vehicle body speed becomes equal to or higher than a predetermined speed.

When the driving fin 40 reaches the open position while opening, the link member 70 comes into contact with the opening stopper 37 of the frame 30, so that the driving fin 40 and the driven fin 50 cannot open further. When the driving fin 40 reaches the closed position while closing, the driving fin 40 and the driven fin 50 come into contact with the closing stoppers 35, 36 of the frame 30, so that the driving fin 40 and the driven fin 50 cannot close further.

In such cases, a load on the motor of the actuator 60, i.e., the value of a current flowing through the motor increases. Therefore, when opening or closing the driving fin 40, the controller 100 determines whether the driving fin 40 has reached the open position or the closed position based on whether the load on the motor has increased. Specifically, when opening or closing the driving fin 40, the controller 100 determines whether the driving fin 40 has reached the open position or the closed position based on whether the value of a current flowing through the motor is equal to or higher than a predetermined criterial current value. The criterial current value is preferably set beforehand based on experiments, simulations, etc.

Here, the rotation angle of the driving fin 40 rotating between the closed position and the open position is referred to as a "reference rotation angle $\theta$st." In this case, if the load on the motor does not increase when the rotation angle $\theta$ of the driving fin 40 opening from the closed position becomes larger than the reference rotation angle $\theta$st, there may be an abnormality in the power transmission path from the actuator 60 to the driving fin 40 and the driven fin 50. Normal power transmission may be prevented, for example, due to interruption at part of the power transmission path. On the other hand, if the load on the motor increases when the rotation angle $\theta$ of the driving fin 40 opening from the closed position is smaller than the reference rotation angle $\theta$st, there may be an abnormality in the power transmission path from the actuator 60 to the driving fin 40 and the driven fin 50. The driving fin 40 may be unable to close, for example, due to a foreign object caught between the driving fin 40 and the driven fin 50. The same applies to when the driving fin 40 closes.

Therefore, the controller 100 determines that there is an abnormality in the power transmission path if a rotation angle $\theta$ of the output shaft 61 of the actuator 60 from when the driving fin 40 starts to move to when the load on the motor increases deviates from the reference rotation angle $\theta$st in a situation where the driving fin 40 is moved from one of the closed position and the open position to the other position. In other words, the controller 100 determines that there is an abnormality in the power transmission path from the actuator 60 to the driving fin 40 and the driven fin 50.

Specifically, the controller 100 determines that there is an abnormality in the power transmission path if the rotation angle $\theta$ of the output shaft 61 from when the driving fin 40 starts to move to when the load on the motor increases is smaller than a lower-limit criterial value $\theta$Lth that is obtained by subtracting a predetermined angle from the reference rotation angle $\theta$st. Further, the controller 100 determines that there is an abnormality in the power transmission path if the rotation angle $\theta$ of the output shaft 61 from when the driving fin 40 starts to move to when the load on the motor increases is equal to or larger than an upper-limit criterial value $\theta$Hth that is obtained by adding a predetermined angle to the reference rotation angle $\theta$st. In other words, the controller 100 determines that there is no abnormality in the power transmission path if the rotation angle $\theta$ of the output shaft 61 up to when the load on the motor increases is equal to or larger than the lower-limit criterial value $\theta$Lth and smaller than the upper-limit criterial value $\theta$Hth.

In the following, a flow of a process performed by the controller 100 will be described with reference to the flowchart shown in FIG. 9. This process is a process that is executed when the opening condition or the closing condition is met.

Figure 9:
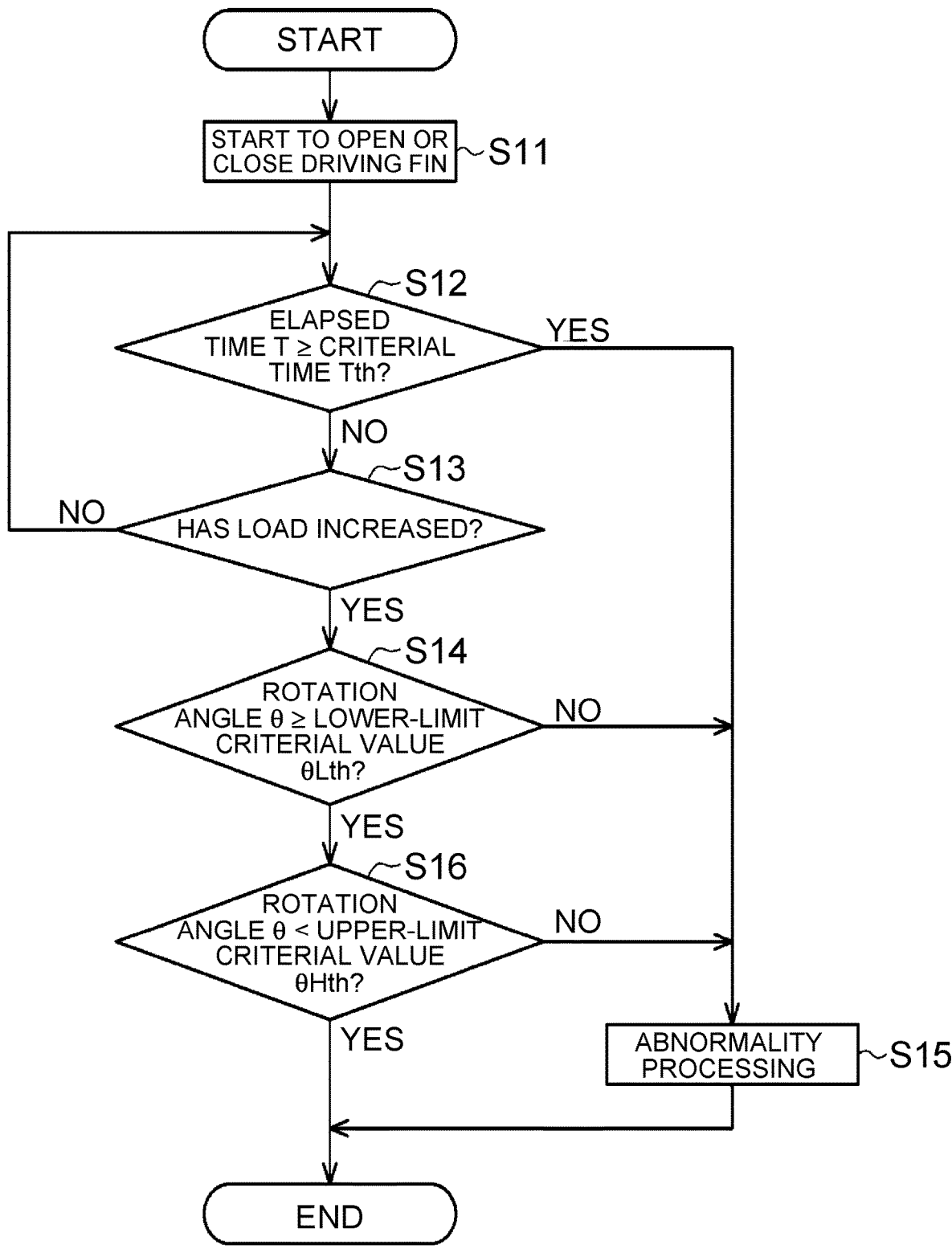
FIG. 9 is a flowchart showing a flow of a process performed by a controller of the grille shutter device of the first embodiment to move the movable fins.

As shown in FIG. 9, the controller 100 starts to open the driving fin 40 by the actuator 60 when the opening condition is met, and starts to close the driving fin 40 by the actuator 60 when the closing condition is met (S11). Then, the controller 100 determines whether an elapsed time T that has elapsed since the start of opening or closing the driving fin 40 is equal to or longer than a predetermined criterial time Tth (S12). The criterial time Tth is set to a time that is slightly longer than a time taken for the driving fin 40 to rotate between the open position and the closed position. If the elapsed time T is equal to or longer than the criterial time Tth (S12: NO), the controller 100 moves to the process of step S15 to be described later.

On the other hand, if the elapsed time T is shorter than the criterial time Tth (S12: NO), the controller 100 determines whether the load on the motor has increased (S13). If the load on the motor has not increased (S13: NO), the controller 100 moves to the process of step S12. On the other hand, if the load on the motor has increased (S13: YES), the controller 100 determines whether the rotation angle $\theta$ of the output shaft 61 of the actuator 60 from when the driving fin 40 started to open or close to when the load on the motor increased is equal to or larger than the lower-limit criterial value $\theta$Lth (S14).

If the rotation angle $\theta$ of the output shaft 61 of the actuator 60 is smaller than the lower-limit criterial value $\theta$Lth (S14: NO), for example, if there is an abnormality in the power transmission path due to the driving fin 40 becoming unable to rotate while opening or closing, the controller 100 performs abnormality processing (S15). For example, as the abnormality processing, the controller 100 returns the driving fin 40 to the closed position if the driving fin 40 is opening, and returns the driving fin 40 to the open position if the driving fin 40 is closing. Further, as the abnormality processing, the controller 100 outputs an alert to a user notifying the user of an abnormality in the grille shutter device 20.

If the rotation angle $\theta$ of the output shaft 61 of the actuator 60 from when the driving fin 40 started to open or close to when the load on the motor increased is equal to or larger than the lower-limit criterial value $\theta$Lth (S14: YES), the controller 100 determines whether the rotation angle $\theta$ of the output shaft 61 of the actuator 60 is smaller than the upper-limit criterial value $\theta$Hth (S16). If the rotation angle $\theta$ of the output shaft 61 of the actuator 60 is equal to or larger than the upper-limit criterial value $\theta$Hth (S16: NO), for example, if there is an abnormality in the power transmission path due to the link member 70 having dropped from the first link 44 of the driving fin 40, the controller 100 moves to the process of step S15. On the other hand, if the rotation angle $\theta$ of the output shaft 61 of the actuator 60 is smaller than the upper-limit criterial value $\theta$Hth (S16: YES), the controller 100 ends the current process. That is, in this case, the controller 100 determines that the driving fin 40 has been normally opened or closed.

The workings of the first embodiment will be described. Specifically, the workings of the grille shutter device 20 when opening the driving fin 40 from the closed position will be described with reference to FIG. 10.

Figure 10:
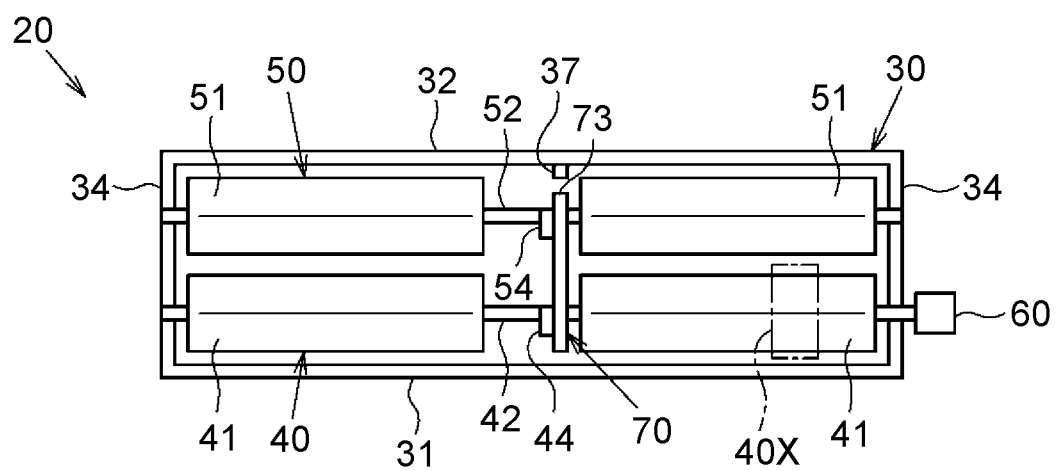
FIG. 10 is a schematic view illustrating the workings of the grille shutter device of the first embodiment.

As shown in FIG. 10, if power fails to be transmitted to the link member 70 when opening the driving fin 40 due to an abnormality occurring at a portion 40X of the driving fin 40, the link member 70 will not come into contact with the opening stopper 37 of the frame 30 no matter how much the output shaft 61 of the actuator 60 rotates. Therefore, the grille shutter device 20 can detect that there is an abnormality in the power transmission path.

If power fails to be transmitted from the driving fin 40 to the link member 70 when opening the driving fin 40 due to the link member 70 having dropped from the first link 44 of the driving fin 40, the link member 70 will not come into contact with the opening stopper 37 of the frame 30 no matter how much the output shaft 61 of the actuator 60 rotates. Therefore, the grille shutter device 20 can detect that there is an abnormality in the power transmission path.

Further, if power fails to be transmitted from the first link 44 of the driving fin 40 to the second link 54 of the driven fin 50 when opening the driving fin 40 due to an abnormality occurring at a portion of the link member 70 between the driving coupling part 71 and the driven coupling part 72, the link member 70 will not come into contact with the opening stopper 37 even when the output shaft 61 of the actuator 60 rotates. Therefore, the grille shutter device 20 can detect that there is an abnormality in the power transmission path.

Effects of the first embodiment will be described. For example, a comparative example is assumed in which whether the driving fin 40 has reached the open position is determined based only on the rotation angle θ of the output shaft 61 of the actuator 60. In this comparative example, the driving fin 40 and the driven fin 50 can be determined to have reached the open position despite not having reached the open position, as long as the output shaft 61 of the actuator 60 rotates a predetermined angle in a situation where there is an abnormality in the driving fin 40 or the link member 70.

By contrast, the grille shutter device 20 determines whether the driving fin 40 and the driven fin 50 have reached the open position by detecting the link member 70 coming into contact with the opening stopper 37 while the driving fin 40 and the driven fin 50 are moving. In the grille shutter device 20, if the driving fin 40 and the driven fin 50 become unable to rotate to the open position due to an abnormality occurring in the driving fin 40 and the link member 70 constituting the power transmission path, the link member 70 will not come into contact with the opening stopper 37. Therefore, the grille shutter device 20 can detect abnormalities occurring in the power transmission path based on whether the link member 70 comes into contact with the opening stopper 37.

Since the grille shutter device 20 includes the closing stopper 35 that defines the closed position of the driving fin 40 by coming into contact with the driving fin 40 and the closing stopper 36 that defines the closed position of the driven fin 50 by coming into contact with the driven fin 50, the closed position of the driving fin 40 and the driven fin 50 can be more accurately defined. The grille shutter device 20 can detect abnormalities occurring in the power transmission path when moving the driving fin 40 from the closed position to the open position.

If the contact part 73 is provided between the driving coupling part 71 and the driven coupling part 72 in the link member 70, the driven fin 50 may fail to be disposed in the open position despite the contact part 73 coming into contact with the opening stopper 37 in a situation where there is an abnormality between the driving coupling part 71 and the driven coupling part 72. Thus, an abnormality in the power transmission path may fail to be detected. In the grille shutter device 20, however, the driven coupling part 72 is located between the driving coupling part 71 and the contact part 73 in the link member 70, so that the contact part 73 does not come into contact with the opening stopper 37 in a situation where there is an abnormality between the driving coupling part 71 and the driven coupling part 72. Therefore, the grille shutter device 20 can accurately detect abnormalities occurring in the power transmission path.

In the grille shutter device 20, the pair of first blades 41 of the driving fin 40 are coupled to each other by the first intermediate shaft 42, and the pair of second blades 51 of the driven fin 50 are coupled to each other by the second intermediate shaft 52. In the grille shutter device 20, this helps achieve positional synchronization between the pair of first blades 41 and between the pair of second blades 51.

If an external force acts on the grille shutter device 20 while the vehicle 10 is traveling, the frame 30 may deform in such a manner that a leading end of the upper wall 32 is lowered relatively to a rear end thereof. In this case, the upper wall 32 of the frame 30 comes into contact with upper portions of the bulges 81 of the intermediate cover 80, so that the upper wall 32 of the frame 30 is restrained from entering a rotation range of the driven fin 50.

Second Embodiment

A grille shutter device 20A according to a second embodiment will be described below with reference to the drawings. Those components in the second embodiment that are substantially the same as in the first embodiment will be denoted by the same reference signs and description thereof will be omitted.

Figure 11:
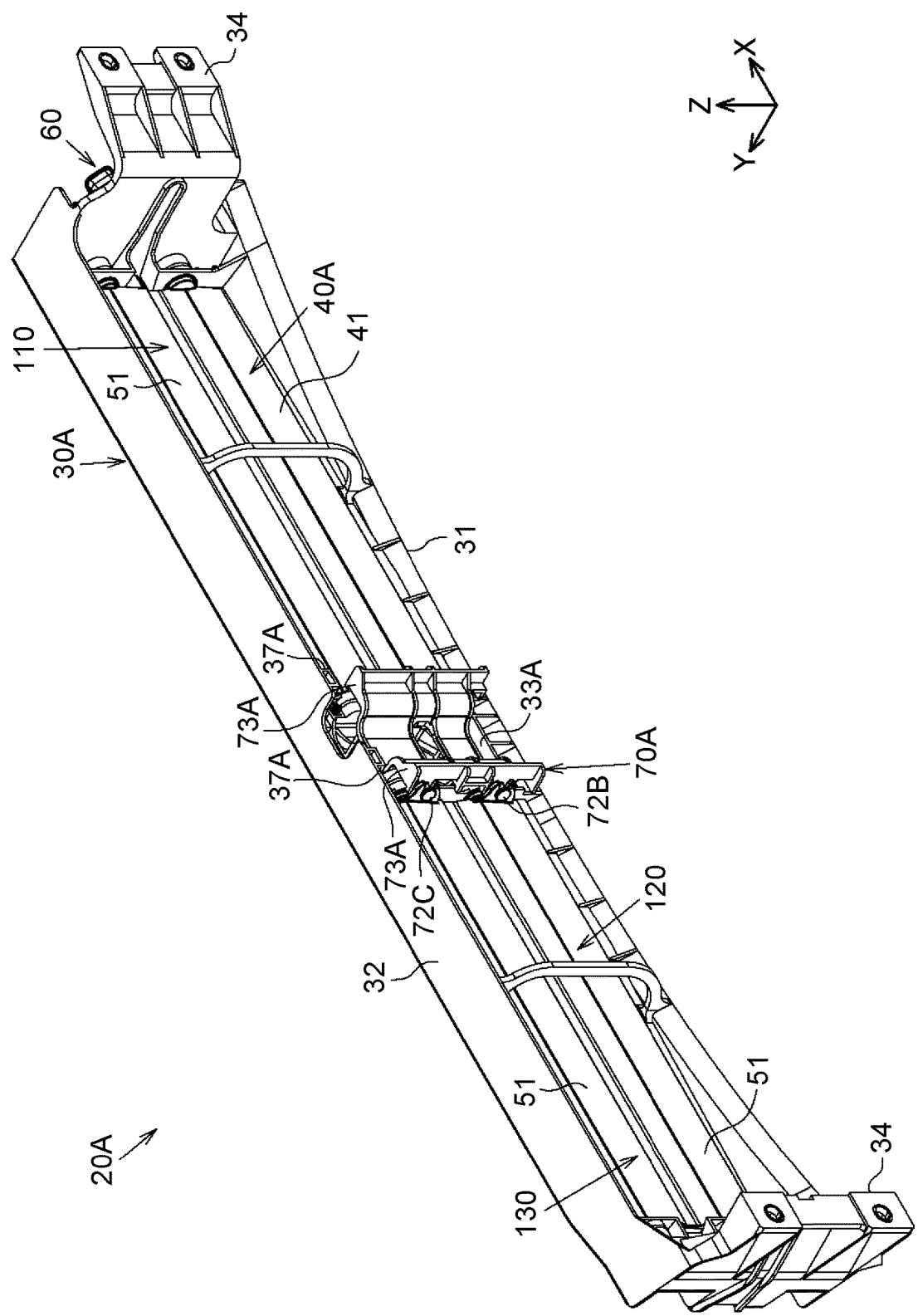
FIG. 11 is a perspective view of a grille shutter device of a second embodiment as seen from a rear upper side.
Figure 12:
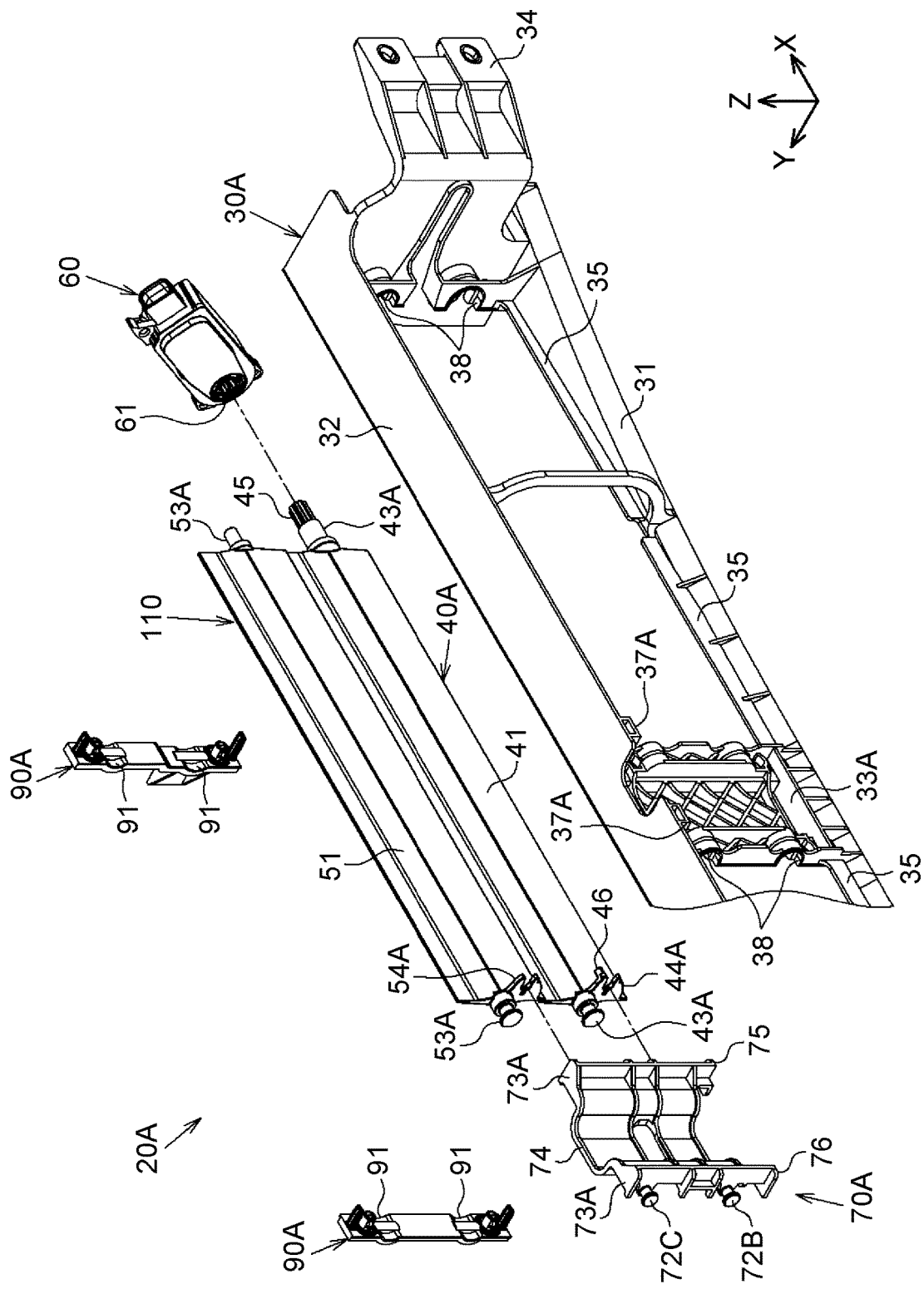
FIG. 12 is an exploded perspective view of the grille shutter device of the second embodiment as seen from the rear upper side.
Figure 13:
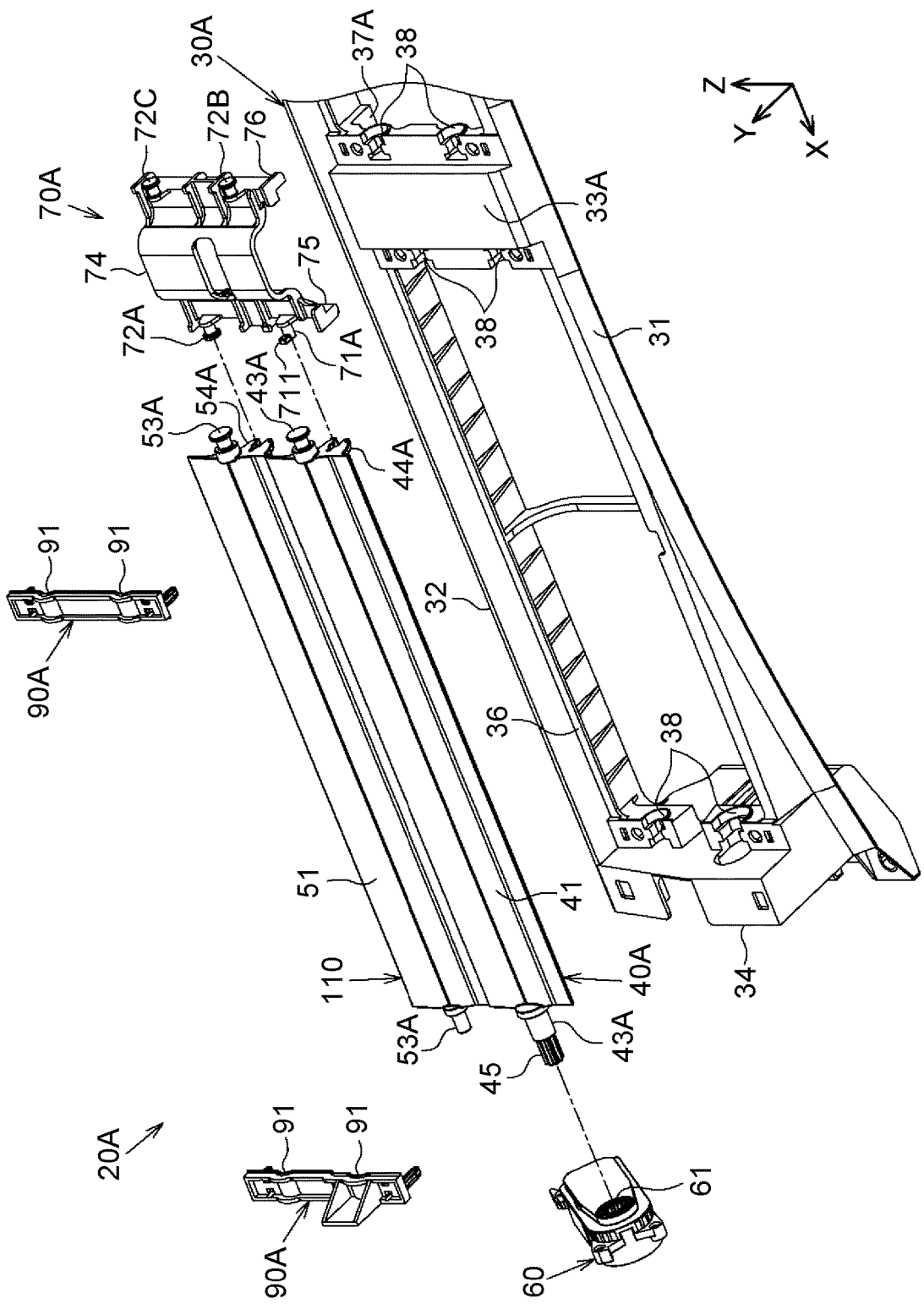
FIG. 13 is an exploded perspective view of the grille shutter device of the second embodiment as seen from a front lower side.

As shown in FIG. 11 to FIG. 13, the grille shutter device 20A includes a frame 30A that constitutes a framework of the grille shutter device 20A, a driving fin 40A and a plurality of driven fins 110, 120, 130 as one example of the "movable fins" that open and close an introduction passage 18, and an actuator 60 that drives the driving fin 40A. The grille shutter device 20A further includes a link member 70A as one example of the "power transmission member" that transmits power from the driving fin 40A to the driven fins 110, 120, 130, a plurality of holding covers 90A that holds end portions of the driving fin 40A and the driven fins 110, 120, 130, and a controller 100 that controls the actuator 60.

As shown in FIG. 11, the frame 30A has a bottom wall 31 and an upper wall 32 that have a longitudinal direction lying along the width direction; an intermediate wall 33A that couples central portions, in the longitudinal direction, of the bottom wall 31 and the upper wall 32 to each other, and a pair of side walls 34 that couple end portions, in the longitudinal direction, of the bottom wall 31 and the upper wall 32 to each other.

As shown in FIG. 12, the bottom wall 31 has a closing stopper 35 that defines a closed position of the driving fin 40A and the second driven fin 120 by coming into contact with the driving fin 40A and the second driven fin 120. The closing stopper 35 is provided along the bottom wall 31 in the longitudinal direction thereof. The closing stopper 35 extends toward the upper wall 32.

As shown in FIG. 13, the upper wall 32 includes a closing stopper 36 that defines a closed position of the first driven fin 110 and the third driven fin 130 by coming into contact with the first driven fin 110 and the third driven fin 130. The closing stopper 36 is provided along the upper wall 32 in the longitudinal direction thereof. The closing stopper 36 extends toward the bottom wall 31. As shown in FIG. 12, the upper wall 32 has a pair of opening stoppers 37A that define open positions of the driving fin 40A and the driven fins 110, 120, 130 by coming into contact with the link member 70A.

The pair of opening stoppers 37A are provided at a central portion, in the longitudinal direction, of the upper wall 32, with a space left therebetween in the longitudinal direction. The pair of opening stoppers 37A protrude toward the bottom wall 31, and leading ends of the pair of opening stoppers 37A have a flat planar shape.

As shown in FIG. 13, each of the intermediate wall 33A and the pair of side walls 34 has a plurality of bearings 38 that rotatably supports the driving fin 40A and the driven fins 110, 120, 130.

As shown in FIG. 12 and FIG. 13, the driving fin 40A has a first blade 41 that has a flat plate shape, a pair of first shafts 43A that extend respectively from both ends of the first blade 41, and a first link 44A that extends in a direction intersecting an axial direction of the driving fin 40A from one end, in a longitudinal direction, of the first blade 41. The shape of a cross-section of the first blade 41 orthogonal to the longitudinal direction thereof is point-symmetrical with respect to a rotational axis of the driving fin 40A as the center. The first shaft 43A of the first blade 41 that extends from an end thereof on the opposite side from an end where the first link 44A is provided includes an input shaft 45 that is connected to the actuator 60. The first link 44A has a plate shape with a plate thickness direction lying in the axial direction of the driving fin 40A, and extends in a plate thickness direction of the driving fin 40A. As shown in FIG. 12, the first link 44A includes, at a leading end, an engaging projection 46 that extends in the axial direction of the driving fin 40A. The first link 44A includes, at the leading end, a shaft hole having an axial direction lying in the axial direction of the driving fin 40A.

As shown in FIG. 12 and FIG. 13, the first driven fin 110 has a second blade 51 that has a flat plate shape, a pair of second shafts 53A that extend respectively from both ends of the second blade 51, and a second link 54A that extends in a direction intersecting an axial direction of the first driven fin 110 from one end, in a longitudinal direction, of the second blade 51. The shape of a cross-section of the second blade 51 orthogonal to the longitudinal direction thereof is point-symmetrical with respect to a rotational axis of the first driven fin 110 as the center. The second link 54A has a plate shape with a plate thickness direction lying in the axial direction of the first driven fin 110, and extends in a plate thickness direction of the first driven fin 110. The second link 54A includes, at a leading end, a shaft hole having an axial direction lying in the axial direction of the driving fin 40A. The second driven fin 120 and the third driven fin 130 have the same configuration as the first driven fin 110 except that the shapes thereof are symmetrical in an axial direction, and therefore description thereof will be omitted.

As shown in FIG. 12 and FIG. 13, the link member 70A includes a main wall 74 that has a rectangular plate shape, and a first flanking wall 75 and a second flanking wall 76 that extend respectively from both ends, in a width direction, of the main wall 74. The link member 70A further has a driving coupling part 71A and a plurality of driven coupling parts 72A to 72C that extend in the width direction from the first flanking wall 75 and the second flanking wall 76, and a pair of contact parts 73A that come into contact with the opening stoppers 37A of the frame 30A.

The first flanking wall 75 and the second flanking wall 76 extend from the main wall 74 toward a rear side and then extend toward outer sides in the width direction. The driving coupling part 71A and the driven coupling parts 72A to 72C have a shaft shape with an axial direction lying in the width direction. As shown in FIG. 13, the driving coupling part 71A has an engaging projection 711 that protrudes in a direction orthogonal to an axial direction of the driving coupling part 71A. The driving coupling part 71A extends in the width direction from a position in the first flanking wall 75 closer to a lower end thereof, and the first driven coupling part 72A extends in the width direction from a position in the first flanking wall 75 closer to an upper end thereof. The second driven coupling part 72B extends in the width direction from a position in the second flanking wall 76 closer to a lower end thereof, and the third driven coupling part 72C extends in the width direction from a position in the second flanking wall 76 closer to an upper end thereof. The driving coupling part 71A and the second driven coupling part 72B are located on the same straight line, and the first driven coupling part 72A and the third driven coupling part 72C are located on the same axis.

The driving coupling part 71A is coupled to the first link 44A of the driving fin 40A. Here, the engaging projection 711 of the driving coupling part 71A engages with the engaging projection 46 of the first link 44A. The first driven coupling part 72A, the second driven coupling part 72B, and the third driven coupling part 72C are coupled respectively to the second link 54A of the first driven fin 110, the second link 54A of the second driven fin 120, and the second link 54A of the third driven fin 130. The contact parts 73A are upper end parts of the pair of flanking walls 75, 76. The contact parts 73A have a flat planar shape that is substantially orthogonal to the up-down direction.

Each holding cover 90A has a plurality of bearings 91 that rotatably supports the driving fin 40A and the driven fins 110, 120, 130. The holding covers 90A are mounted respectively to the intermediate wall 33A and the pair of side walls 34 of the frame 30A by snap fitting.

As shown in FIG. 11, in a state where the grille shutter device 20A is assembled, the pair of first shafts 43A of the driving fin 40A are held in the front-rear direction between the bearing 38 of the intermediate wall 33A and the bearing 38 of the side wall 34 of the frame 30A on one side and the bearings 91 of the holding covers 90A on the other side. Similarly, the pair of second shafts 53A of the driven fins 110, 120, 130 are held in the front-rear direction between the bearing 38 of the intermediate wall 33A and the bearing 38 of the side wall 34 of the frame 30A on one side and the bearings 91 of the holding covers 90A on the other side.

Thus, the driving fin 40A and the driven fins 110, 120, 130 can rotate around an axis extending in the width direction. The first driven fin 110 is disposed next to the driving fin 40A in the up-down direction, and the second driven fin 120 is disposed next to the driving fin 40A in the axial direction of the driving fin 40A. Further, the third driven fin 130 is disposed next to the first driven fin 110 in the axial direction of the first driven fin 110 and next to the second driven fin 120 in the up-down direction.

Figure 14:
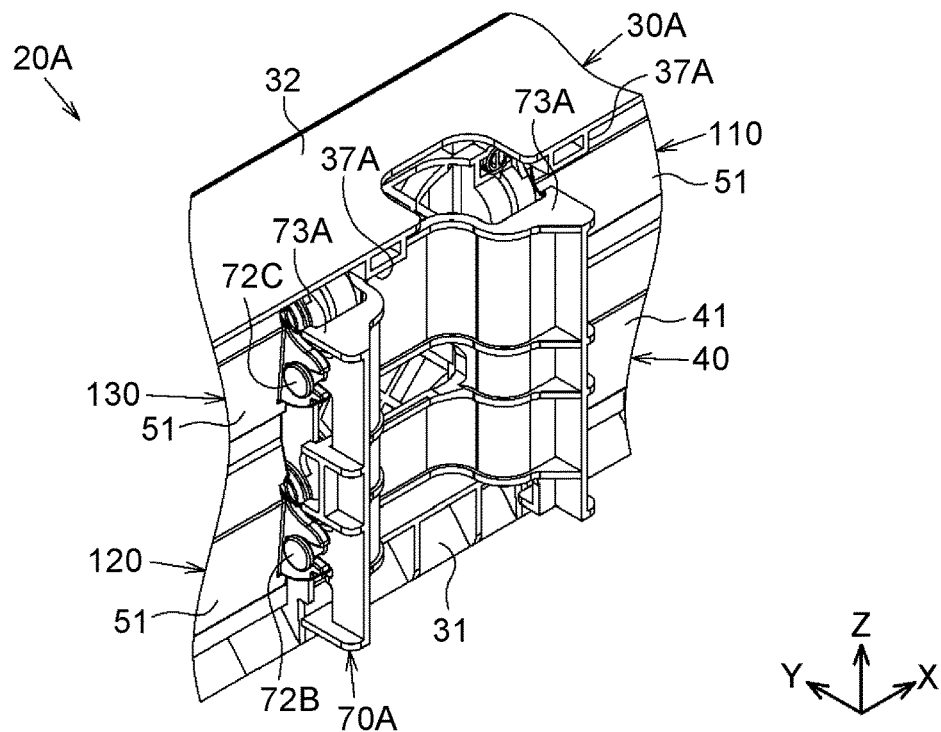
FIG. 14 is a partial perspective view of the grille shutter device of the second embodiment as seen from the rear upper side, with movable fins disposed in a closed position.

As shown in FIG. 14, in a state where the grille shutter device 20A is assembled, the intermediate wall 33A of the frame 30A, the first link 44A of the driving fin 40A, the second link 54A of the first driven fin 110, and the link member 70A constitute a parallel crank mechanism as a so-called four-joint link mechanism. Similarly, the intermediate wall 33A of the frame 30A, the first link 44A of the driving fin 40A, the second link 54A of the third driven fin 130, and the link member 70A constitute a parallel crank mechanism as a so-called four-joint link mechanism. Further, the intermediate wall 33A of the frame 30A, the first link 44A of the driving fin 40A, the second link 54A of the second driven fin 120, and the link member 70A constitute a link mechanism that synchronizes rotation of the first link 44A of the driving fin 40A and that of the second link 54A of the second driven fin 120.

Thus, the posture of the first link 44A of the driving fin 40A and the postures of the second links 54 of the first driven fin 110, the second driven fin 120, and the third driven fin 130 are linked to each other. In other words, the posture of the driving fin 40A and the postures of the driven fins 110, 120, 130 are linked to each other. The contact parts 73A of the link member 70A are directed upward and thereby face the opening stoppers 37A of the frame 30A.

Figure 15:
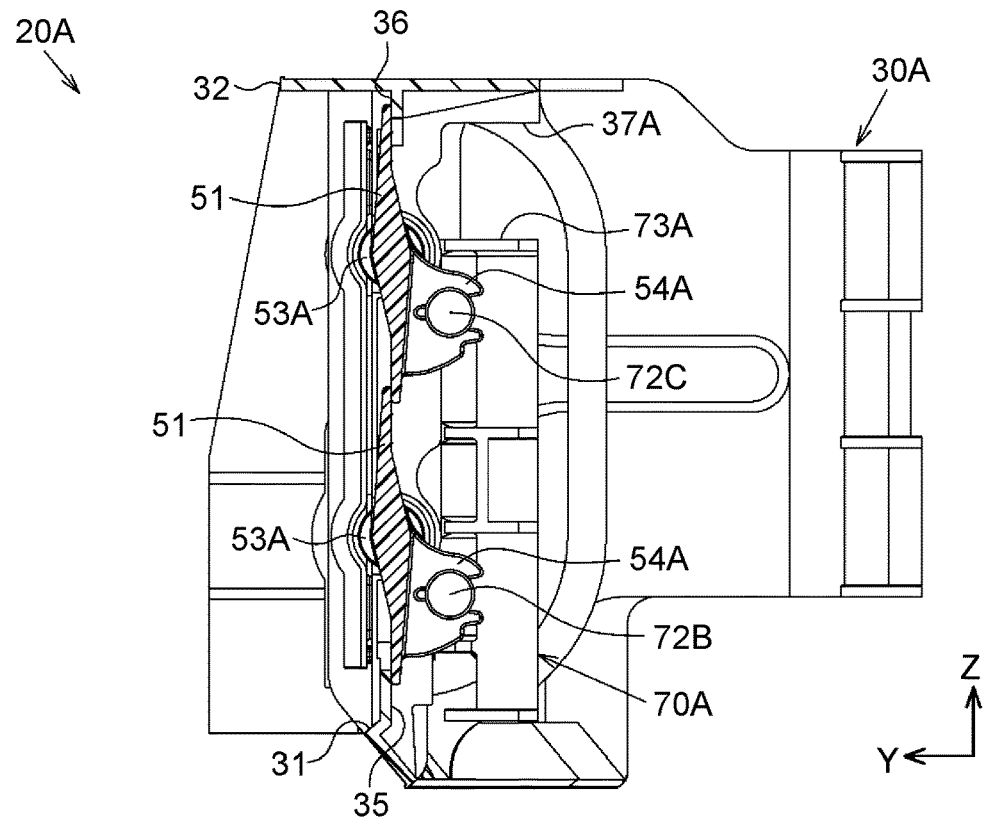
FIG. 15 is a sectional view of the grille shutter device of the second embodiment as seen from the width direction, with the movable fins disposed in the closed position.

Next, the operation of the grille shutter device 20A will be described with reference to FIG. 14 to FIG. 17. As shown in FIG. 14 and FIG. 15, for example, when it is desired to warm up the engine 12 or reduce air resistance that the vehicle experiences while traveling, the actuator 60 is driven to dispose the driving fin 40A and the driven fins 110, 120, 130 in the closed position in which the introduction passage 18 is closed. In this case, the link member 70A is located at a position that is farthest away from the opening stoppers 37A of the frame 30A in the up-down direction, i.e., a lowered position that is the lowest position in a movable range of the link member 70A. The lowered position of the link member 70A is a position corresponding to the closed position of the driving fin 40A and the driven fins 110, 120, 130.

When the driving fin 40A is disposed in the closed position, lower ends of the first blade 41 of the driving fin 40A and the second blade 51 of the second driven fin 120 come into contact with the closing stopper 35 of the bottom wall 31 of the frame 30A from a rear side, while upper ends of the second blades 51 of the first driven fin 110 and the third driven fin 130 come into contact with the closing stopper 36 of the upper wall 32 of the frame 30A from a front side. Further, upper ends of the first blade 41 of the driving fin 40A and the second blade 51 of the second driven fin 120 come into contact respectively with lower ends of the second blade 51 of the first driven fin 110 and the second blade 51 of the third driven fin 130. Thus, the closed position of the driving fin 40A and the driven fins 110, 120, 130 is defined by the driving fin 40A and the driven fins 110, 120, 130 coming into contact with the frame 30A and by the driving fin 40A and the driven fins 110, 120, 130 coming into contact with each other.

Figure 16:
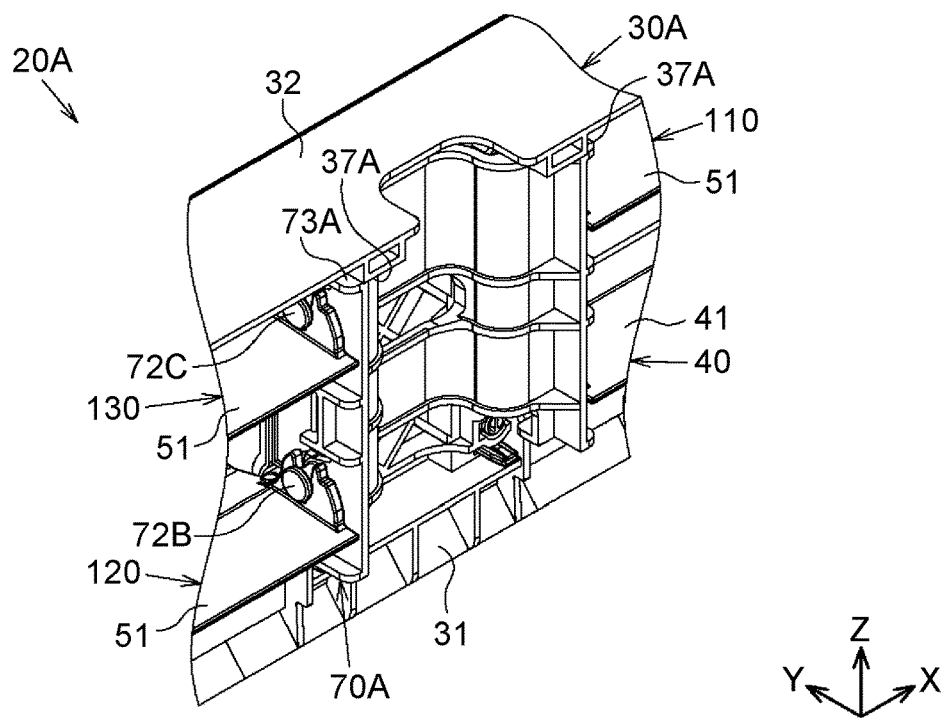
FIG. 16 is a partial perspective view of the grille shutter device of the second embodiment as seen from the rear upper side, with the movable fins disposed in an open position.
Figure 17:
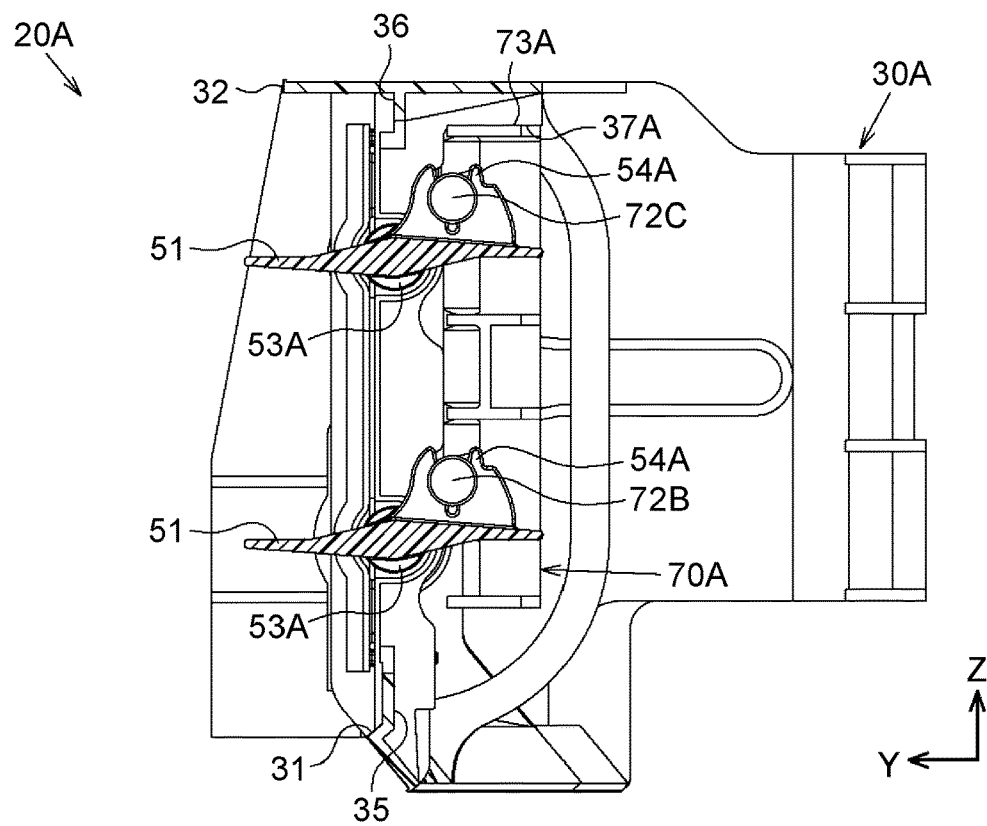
FIG. 17 is a sectional view of the grille shutter device of the second embodiment as seen from the width direction, with the movable fins disposed in the open position.

On the other hand, as shown in FIG. 16 and FIG. 17, for example, when it is desired to cool the engine 12, the actuator 60 is driven to dispose the driving fin 40A and the driven fins 110, 120, 130 in the open position in which the introduction passage 18 is open. In this case, the link member 70A is located at a position at which the link member 70A comes into contact with the opening stoppers 37A of the frame 30A in the up-down direction, i.e., a raised position that is the highest position in the movable range of the link member 70A. The raised position of the link member 70A is a position corresponding to the open position of the driving fin 40A and the driven fins 110, 120, 130.

When the driving fin 40A and the driven fins 110, 120, 130 are located in the open position, the first blade 41 of the driving fin 40A and the second blades 51 of the driven fins 110, 120, 130 come into contact with neither each other nor the frame 30A. The open position of the driving fin 40A and the driven fins 110, 120, 130 is defined by the link member 70A and the opening stoppers 37A of the frame 30A coming into contact with each other.

Thus, the grille shutter device 20A rotates the driving fin 40A between the closed position and the open position by driving the actuator 60. The grille shutter device 20A rotates the driven fins 110, 120, 130 between the closed position and the open position as the link member 70A transmits power of the driving fin 40A to the driven fins 110, 120, 130. In the second embodiment, the open position is one example of the "first position" in the claims, and the opening stoppers 37A are one example of the "first stopper" in the claims. The closed position is one example of the "second position" in the claims, and the closing stopper 35 is one example of the "second stopper" in the claims.

The grille shutter device 20A according to the second embodiment works in a similar manner to the grille shutter device 20 according to the first embodiment and can achieve the above-described effects. In addition, the grille shutter device 20A according to the second embodiment can achieve the following effect.

In the grille shutter device 20A, the driving fin 40A and the second driven fin 120 are separated from each other in the width direction, and the first driven fin 110 and the third driven fin 130 are separated from each other in the width direction. Thus, the configuration of the grille shutter device 20A can be simplified in that it does not include a driving fin and a driven fin that have a large length in the width direction.

The embodiments can be implemented with the following modifications made thereto. The embodiments and the following modified examples can be implemented in combination within such a range that no technical inconsistency arises.—Since the driving fin 40 is a member that is made of a resin material and long in the axial direction, the driving fin 40 may become twisted around the axial direction. In the first embodiment, therefore, when the output shaft 61 of the actuator 60 rotates, the rotation angle θ of the output shaft 61 and the rotation angle of the first intermediate shaft 42 of the driving fin 40 do not always match. As a remedy, the controller 100 may perform an initialization process for making the rotation angle θ of the output shaft 61 of the actuator 60 and the rotation angle of the first intermediate shaft 42 of the driving fin 40 correspond to each other.

When performing the initialization process, the driving fin 40 and the driven fin 50 are disposed in the closed position and the link member 70 is disposed in the lowered position. In the initialization process, the controller 100 recognizes the rotation angle θ of the output shaft 61 from when the actuator 60 starts to be driven to when the link member 70 comes into contact with the opening stopper 37 as a rotation angle required to shift the driving fin 40 from the closed position to the open position, in other words, a rotation angle required to shift the link member 70 from the lowered position to the raised position. It is therefore preferable that the controller 100 output an error if, in the initialization process, the rotation angle θ of the output shaft 61 from when the actuator 60 starts to be driven becomes equal to or larger than a criterial rotation angle for initialization that is larger than the reference rotation angle θst. The criterial rotation angle for initialization is set so as to be larger when the first blade 41 of the driving fin 40 is longer in the axial direction and as the torsional rigidity of the driving fin 40 is lower.

Figure 18:
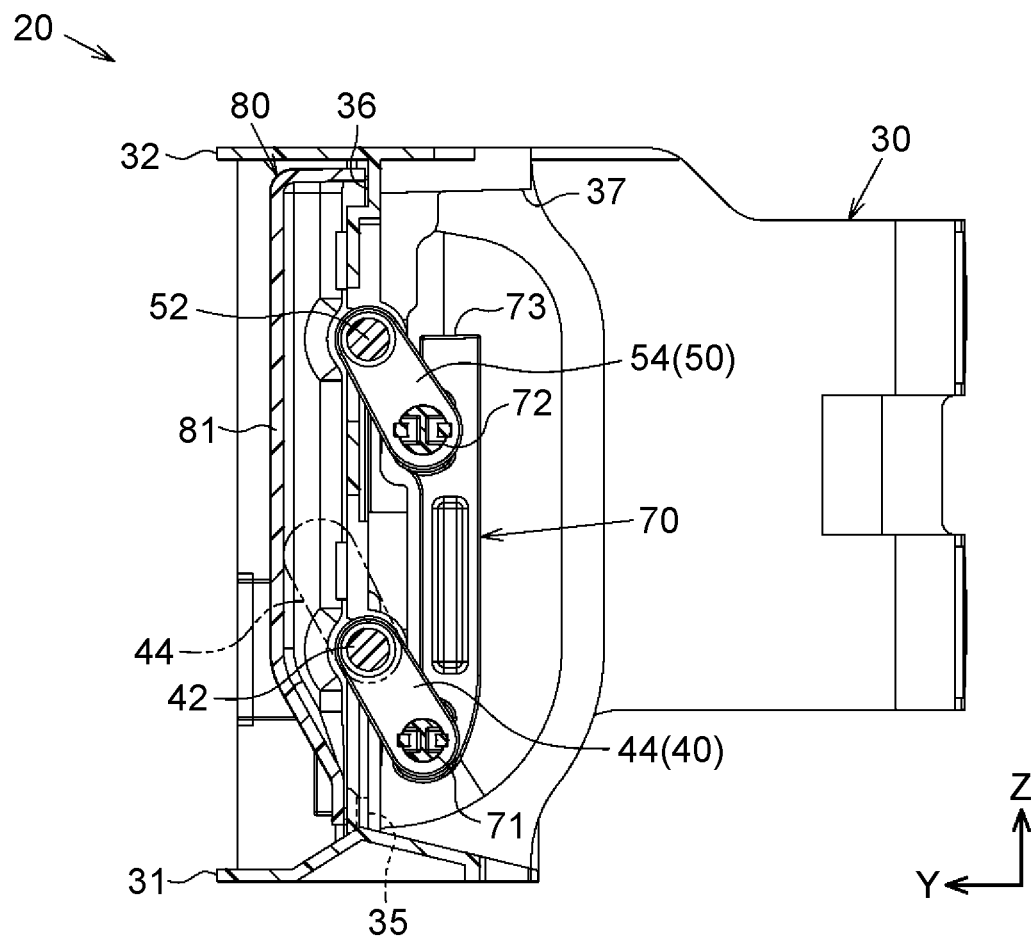
FIG. 18 is a sectional view of a grille shutter device of a modified example as seen from a width direction.

As shown in FIG. 18, in the first embodiment, the first link 44 of the driving fin 40 and the second link 54 of the driven fin 50 overlap the bulges 81 of the intermediate cover 80 in the width direction. Therefore, in the initialization process, the first link 44 of the driving fin 40 does not come into contact with the bulges 81 of the intermediate cover 80 even when the rotation angle θ of the output shaft 61 becomes equal to or larger than the criterial rotation angle for initialization due to, for example, the link member 70 having dropped from the first link 44. In other words, in the initialization process, the first link 44 of the driving fin 40 does not come into contact with the bulges 81 of the intermediate cover 80 as indicated by the long dashed double-short dashed line in FIG. 18. Thus, having the bulges 81 provided on the intermediate cover 80, the grille shutter device 20 can avoid a situation where the intermediate cover 80 hinders the initialization process.

The grille shutter device 20 may include a plurality of driven fins 50 that is disposed next to each other in the up-down direction. In this case, the link member 70 has a plurality of driven coupling parts that is coupled respectively to the second links 54 of the driven fins 50. In the link member 70, the driven coupling parts are preferably located between the driving coupling part 71 and the contact part 73 in the up-down direction. The same applies to the second embodiment.

In the link member 70, the position at which the contact part 73 is provided may be changed as necessary. In this case, it is preferable that the opening stopper 37 of the frame 30 be provided at a position at which it can come into contact with the contact part 73 of the link member 70 located in the raised position. The same applies to the second embodiment.

The grille shutter device 20 may be configured to define the closed position of the driving fin 40 and the driven fin 50 by the link member 70 coming into contact with the "closing stopper," and to define the open position of the driving fin 40 and the driven fin 50 by the driving fin 40 and the driven fin 50 coming into contact with the "opening stopper." In this case, the closing stopper is one example of the first stopper in the claims, and the opening stopper is one example of the second stopper in the claims. The same applies to the second embodiment.

The grille shutter device may further include a second stopper that is configured to define a second position by coming into contact with the driving fin. The second position may be the other position of the open position and the closed position. In this configuration, since the second stopper that defines the second position of the driving fin by coming into contact with the driving fin is included, the second position of the driving fin can be more accurately defined. The grille shutter device can detect abnormalities occurring in the power transmission path when moving the driving fin from the second position to the first position.

In the grille shutter device, the power transmission member may include a driving coupling part that is coupled to the driving fin, a driven coupling part that is coupled to the driven fin, and a contact part that is configured to come into contact with the first stopper. The power transmission member may be a link member that constitutes a link mechanism together with the driving fin and the driven fin. The driven coupling part may be located between the driving coupling part and the contact part in the power transmission member.

If the contact part is located between the driving coupling part and the driven coupling part in the power transmission member, the driven fin may fail to be disposed in the first position despite the contact part of the power transmission member coming into contact with the first stopper in a situation where there is an abnormality between the driving coupling part and the driven coupling part. Thus, abnormalities in the power transmission path may fail to be detected.

In the grille shutter device of the above-described configuration, however, the driven coupling part is located between the driving coupling part and the contact part in the power transmission member, so that the contact part of the power transmission member does not come into contact with the first stopper in a situation where there is an abnormality between the driving coupling part and the driven coupling part. Therefore, the grille shutter device can accurately detect abnormalities occurring in the power transmission path.

In the grille shutter device, the driving fin and the driven fin may be disposed next to each other in an up-down direction of the introduction passage. The driving fin may include a pair of first blades that are disposed next to each other in an axial direction of the driving fin, a first intermediate shaft that couples the pair of first blades to each other, and a first link that extends in a radial direction from the intermediate shaft. The driven fin may include a pair of second blades that are disposed next to each other in an axial direction of the driven fin, a second intermediate shaft that couples the pair of second blades to each other, and a second link that extends in a radial direction from the second intermediate shaft. In the power transmission member, the driving coupling part may be coupled to the first link and the driven coupling part may be coupled to the second link.

In this configuration, the pair of first blades of the driving fin are coupled to each other by the first intermediate shaft, and the pair of second blades of the driven fin are coupled to each other by the second intermediate shaft. In the grille shutter device, this helps achieve positional synchronization between the pair of first blades and between the pair of second blades.

In the grille shutter device, the driven fin may include a first driven fin that is disposed next to the driving fin in an up-down direction of the introduction passage, a second driven fin that is disposed next to the driving fin in an axial direction of the driving fin, and a third driven fin that is disposed next to the first driven fin in an axial direction of the first driven fin and next to the second driven fin in the up-down direction. When the driven coupling part is a first driven coupling part, the first driven coupling part may be coupled to the first driven fin. The power transmission member may include a second driven coupling part and a third driven coupling part. The second driven coupling part may be disposed on the same axis as the driving coupling part and coupled to the second driven fin. The third driven coupling part may be disposed on the same axis as the first driven coupling part and coupled to the third driven fin.

In this configuration, the driving fin and the second driven fin are separated from each other in the width direction, and the first driven fin and the third driven fin are separated from each other in the width direction. Thus, the configuration of the grille shutter device can be simplified in that it does not include a driving fin and a driven fin that have a large length in the width direction.

In the first embodiment and the second embodiment, the actuator 60 may be disposed at the center in the width direction. —In the first embodiment, the link member 70 and the opening stopper 37 may be disposed on one end side, in the width direction, of the grille shutter device 20.

In the first embodiment, as long as the link member 70 can transmit power from the driving fin 40 to the driven fin 50, power may be transmitted without using a link mechanism. For example, the link member 70 may be a "power transmission member" that is a belt, sprocket, wire, gear, or the like that transmits power from the driving fin 40 to the driven fin 50. The same applies to the second embodiment.

In the second embodiment, the link member 70A and the opening stoppers 37A may be disposed respectively on one end side and the other end side in the width direction of the grille shutter device 20A. —The controller 100 can be configured as one or more processors that operate in accordance with a computer program (software), or as one or more dedicated hardware circuits, such as dedicated hardware (application-specific integrated circuits (ASIC)), that execute at least some of various processes, or as a circuit including a combination of the processor and the hardware circuit. The processor includes a CPU and a memory, such as a RAM or a ROM, and the memory stores program codes or commands configured to cause the CPU to execute processes. The term "memory," i.e., a storage medium, here covers all available media that can be accessed by a general-purpose or dedicated computer.

What is claimed is:

1. A grille shutter device that opens and closes an introduction passage through which air is introduced from an opening provided at a front part of a vehicle to an inside of the vehicle, the grille shutter device comprising: a driving fin and a driven fin that are configured to rotate between an open position in which the introduction passage is open and a closed position in which the introduction passage is closed; an actuator configured to drive the driving fin; a power transmission member configured to transmit power from the driving fin to the driven fin; and a first stopper configured to define a first position by coming into contact with the power transmission member, the first position being one of the open position and the closed position, and a controller configured to open and close the driving fin by controlling the actuator, wherein the controller is configured to start to open the driving fin when an opening condition is met or start to close the driving fin when a closing condition is met, compare an elapsed time since the start of opening or closing the driving fin to a predetermined time, when the elapsed time is less than the predetermined time, determine whether a load on the actuator has increased, when the load on the actuator has increased, compare a rotation angle of an output shaft of the actuator from when the driving fin started to open or close to when the load on the actuator increased to a lower-limit predetermined angle and to an upper-limit predetermined angle, and perform abnormality processing when the elapsed time is equal to or longer than the predetermined time, or when the rotation angle of the output shaft of the actuator from when the driving fin started to open or close to when the load on the actuator increased is less than the lower-limit predetermined angle or is greater than or equal to the upper-limit predetermined angle.

2. The grille shutter device according to claim 1, further comprising a second stopper configured to define a second position by coming into contact with the driving fin, the second position being the other one of the open position and the closed position.

3. The grille shutter device according to claim 1, wherein: the power transmission member includes a driving coupling part that is coupled to the driving fin, a driven coupling part that is coupled to the driven fin, and a contact part that comes into contact with the first stopper;

the power transmission member is a link member that constitutes a link mechanism together with the driving fin and the driven fin; and the driven coupling part is located between the driving coupling part and the contact part in the power transmission member.

4. The grille shutter device according to claim 3, wherein:

the driving fin and the driven fin are disposed next to each other in an up-down direction of the introduction passage;

the driving fin includes a pair of first blades that are disposed next to each other in an axial direction of the driving fin, a first intermediate shaft that couples the pair of first blades to each other, and a first link that extends in a radial direction from the first intermediate shaft;

the driven fin includes a pair of second blades that are disposed next to each other in an axial direction of the driven fin, a second intermediate shaft that couples the pair of second blades to each other, and a second link that extends in a radial direction from the second intermediate shaft; and in the power transmission member, the driving coupling part is coupled to the first link and the driven coupling part is coupled to the second link.

5. The grille shutter device according to claim 3, wherein:

the driven fin includes a first driven fin that is disposed next to the driving fin in an up-down direction of the introduction passage, a second driven fin that is disposed next to the driving fin in an axial direction of the driving fin, and a third driven fin that is disposed next to the first driven fin in an axial direction of the first driven fin and next to the second driven fin in the up-down direction;

when the driven coupling part is a first driven coupling part, the first driven coupling part is coupled to the first driven fin; and the power transmission member includes a second driven coupling part and a third driven coupling part, the second driven coupling part being disposed on the same axis as the driving coupling part and coupled to the second driven fin, the third driven coupling part being disposed on the same axis as the first driven coupling part and coupled to the third driven fin.

6. The grille shutter device according to claim 1, wherein the abnormality processing includes returning the driving fin to the closed position if the driving fin is opening, returning the driving fin to the open position if the driving fin is closing, and outputting an alert.

\* \* \* \* \*